(12) United States Patent
Salafia, III et al.

(10) Patent No.: US 7,520,421 B2
(45) Date of Patent: Apr. 21, 2009

(54) SYSTEM AND METHOD TO CREATE ELECTRONIC DEPOSIT RECORDS AND TO TRACK THE STATUS OF A DEPOSIT

(75) Inventors: Louis V. Salafia, III, Mt. Airy, MD (US); Kevin H. Connelly, Olathe, KS (US); Josh J. Mann, Kansas City, MO (US)

(73) Assignee: International Financial Services, Inc., Westminster, MD (US)

( * ) Notice: Subject to any disclaimer, the term of this patent is extended or adjusted under 35 U.S.C. 154(b) by 524 days.

(21) Appl. No.: 10/937,512

(22) Filed: Sep. 10, 2004

(65) Prior Publication Data

US 2005/0108164 A1 May 19, 2005

Related U.S. Application Data

(60) Provisional application No. 60/502,284, filed on Sep. 12, 2003.

(51) Int. Cl.
*G06Q 40/00* (2006.01)
*G07F 19/00* (2006.01)
(52) U.S. Cl. .................................. 235/379; 705/39
(58) Field of Classification Search ............... 235/379, 235/472.01, 375, 380; 705/1, 16, 35–45
See application file for complete search history.

(56) References Cited

U.S. PATENT DOCUMENTS

| 5,630,073 | A | 5/1997 | Nolan | |
|---|---|---|---|---|
| 7,216,098 | B1* | 5/2007 | Brooks et al. | 705/30 |
| 2001/0054643 | A1* | 12/2001 | Siemens | 235/379 |
| 2004/0210515 | A1* | 10/2004 | Hughes | 705/39 |
| 2005/0096986 | A1* | 5/2005 | Taylor et al. | 705/16 |

\* cited by examiner

*Primary Examiner*—Daniel A Hess
(74) *Attorney, Agent, or Firm*—Oliff & Berridge, PLC

(57) ABSTRACT

A method of making, tracking and confirming the receipt of bank deposits by a user to a financial institution is disclosed. The method includes first accessing a user account on a database, entering deposit information including the account number and amount of the intended deposit on the database to create an electronic deposit record, and then encoding the deposit information in a machine readable format. The information is then associated with the encoded deposit information in close proximity with the deposit, creating a deposit package. The package is then transmitted to a financial institution or armored car carrier where the machine readable encoded deposit information is read and transmitted to a database that contains information about the account and status of the deposit.

9 Claims, 34 Drawing Sheets

DTS Data Entry Field

| Authentication | | Messages |
|---|---|---|
| USERNAME [ ] | | |
| PASSWORD [ ] | | Messages |
| [ LOGIN ] | | |

| DTS LOGO |
|---|
| HOME |

ADVERTISEMENT

ADVERTISEMENT

Fig. 3

DTS Data Entry Field

| DTS LOGO | | | | | |
|---|---|---|---|---|---|
| HOME | CREATE | MANAGE | REPORT | ADMINISTRATION | HELP |

DTS Deposit Wizard
STEP 1 ● 2 ● 3 ○ 4 ○

| Value of $1 Bills | 113 | | Number of Checks | 0 |
| Value of $2 Bills | 0 | | Value of Checks | 0.00 |
| Value of $5 Bills | 65 | | | |
| Value of $10 Bills | 220 | | | |
| Value of $20 Bills | 400 | | Value of $1 Coupons | 0 |
| Value of $50 Bills | 650 | | Value of $5 Coupons | 0 |
| Value of $100 Bills | 300 | | Value of $10 Coupons | 0 |
| Value of Coins | 0 | | | |

Total Cash Amount: $1,748.00
Total Coin Amount: $0.00
Total Checks Amount: $0.00
Total Coupons Amount: $0.00
Total Deposit Amount: $1,748.00

Date of Sale: 12/15/2005

[<<BACK] [CALCULATE] [CLEAR ALL]

Fig. 4

DTS Data Output

| HOME | CREATE | MANAGE | REPORT | ADMINISTRATION | HELP |

DTS Deposit Wizard
STEP ① ② ③ ④

Messages

Messages

Company Name
Store Name
Sales Date: 1-10-2005     1-10-2005

Cash:    $255.00
Coin:    $22.08
Checks:    $85.15
Coupons:    $16.00

Bank Name
Bank Vault Name

Total:    $378.23

Transaction Number:   Bag Number : MICR Number   Deposit:

2D Barcode

| PRINT | | CREATE ANOTHER DEPOSIT |

Fig. 5

DTS Sample Deposit Slip

Company Name
Store Name
Sales Date: 1-10-2005        1-10-2005

Cash:    $255.00
Coin:     $22.08
Checks:   $85.15
Coupons: $16.00

Bank Name
Bank Vault
Name          Total:     $378.23

Transaction Number: Bag Number : MICR Number    Deposit: [2D Barcode]

Please fold this under, along the line above.
--It is not necessary to reprint this form if your printing comes out slanted--

Fig. 5a

DTS Search

| DTS LOGO | | | | |
|---|---|---|---|---|
| HOME | CREATE | MANAGE | REPORT | ADMINISTRATION | HELP |

Track Deposits

Key: P=Prepared, R=Received, C=Credited, V=Verified
✓ Information Available    X Information Not Available    A Received by Armored Carrier    D Deposit Adjusted

| Transaction | Location | Store # | Sales Date | Bag Number | Total Deposit | P | R | C | V |
|---|---|---|---|---|---|---|---|---|---|
| Number | Name | Number | Date | Number | Amount | x | D | x | ✓ |
| Number | Name | Number | Date | Number | Amount | ✓ | A | ✓ | x |
| Number | Name | Number | Date | Number | Amount | ✓ | ✓ | x | x |

[<< BACK]  [PRINT]

Fig. 6

TRACK DEPOSIT – DEPOSIT DETAILS

DTS LOGO

| HOME | CREATE | MANAGE | REPORT | ADMINISTRATION | HELP |

Track Deposits

Bag Number: 7841245

Transaction ID: CA1315DJA16

Location Name: Morehouse

Location Serial #: 456

| | Reported | Verified | Discrepancy |
|---|---|---|---|
| Value of $1 Bills | 146.00 | 146.00 | 0 |
| Value of $2 Bills | 0 | 0 | 0 |
| Value of $5 Bills | 155.00 | 150.00 | 5.00 |
| Value of $10 Bills | 0 | 0 | 0 |
| Value of $20 Bills | 600.00 | 600.00 | 0 |
| Value of $50 Bills | 850.00 | 850.00 | 0 |
| Value of $100 Bills | 900.00 | 900.00 | 0 |
| Value of Coins | 0 | 0 | 0 |

| | Reported | Verified | Discrepancy |
|---|---|---|---|
| Check Number | 0 | 0 | 0 |
| Check Value | 0 | 0 | 0 |
| Value of $1 Coupons | 0 | 0 | 0 |
| Value of $5 Coupons | 0 | 0 | 0 |
| Value of $10 Coupons | 0 | 0 | 0 |

Adjustment Reason: Counterfeit Currency

Tracking Information: 1/11./2005  9:37 AM

| << BACK | | PRINT |

Fig. 7

DTS Deposit Creation Screen

| DTS LOGO | | | | | |
|---|---|---|---|---|---|
| HOME | CREATE | MANAGE | REPORT | ADMINISTRATION | HELP |

DTS Deposit Wizard
STEP ① ② ③ ④

| | | | |
|---|---|---|---|
| Value of $1 Bills | 0 | Number of Checks | 0 |
| Value of $2 Bills | 0 | Value of Checks | 0.00 |
| Value of $5 Bills | 0 | | |
| Value of $10 Bills | 0 | Value of $1 Coupons | 0 |
| Value of $20 Bills | 0 | Value of $5 Coupons | 0 |
| Value of $50 Bills | 0 | Value of $10 Coupons | 0 |
| Value of $100 Bills | 0 | | |
| Value of Coins | 0 | | |

Total Cash Amount: $0.00
Total Coin Amount: $0.00
Total Checks Amount: $0.00
Total Coupons Amount: $0.00
Total Deposit Amount: $0.00

Date of Sale: 12/15/2005

[<<BACK]  [CALCULATE]  [CLEAR ALL]

Fig. 8

DTS Parameter Error

| DTS LOGO | | | | |
|---|---|---|---|---|
| HOME | CREATE | MANAGE | REPORT | ADMINISTRATION | HELP |

DTS Deposit Wizard
STEP 1 2 3 4

| Value of $1 Bills | 0 | | Number of Checks | 0 |
| Value of $2 Bills | 07* | | Value of Checks | 0.00 |
| *Invalid value entered. Must be numbers and commas only.* | | | | |
| Value of $5 Bills | 0 | | | |
| Value of $10 Bills | 65 | | Value of $1 Coupons | 0 |
| *Must be divisible by $10 bills.* | | | | |
| Value of $20 Bills | 0 | | Value of $5 Coupons | 0 |
| Value of $50 Bills | 0 | | Value of $10 Coupons | 0 |
| Value of $100 Bills | 0 | | | |
| Value of Coins | 0 | | Date of Sale | 12/15/2005 |

Total Cash Amount: $0.00
Total Coin Amount: $0.00
Total Checks Amount: $0.00
Total Coupons Amount: $0.00
Total Deposit Amount: $0.00

[<<BACK] [CALCULATE] [CLEAR ALL] [FINISHED]

Fig. 9

DTS Parameter Error

| DTS LOGO | | | | | |
|---|---|---|---|---|---|
| HOME | CREATE | MANAGE | REPORT | ADMINISTRATION | HELP |

DTS Deposit Wizard
STEP ①  ❷  ③  ④

Value of $1 Bills       [ 0 ]            Number of Checks        [ 0 ]

Value of $2 Bills       [ 0 ]            Value of Checks         [ 100000000> ]
                                         *Invalid value entered. It*
Value of $5 Bills       [ 0 ]            *must be in US currency*
                                         *Only one amount may be*
Value of $10 Bills      [ 0 ]            *entered.*

Value of $20 Bills      [ 0 ]            Value of $1 Coupons     [ 0 ]

Value of $50 Bills      [ 0 ]            Value of $5 Coupons     [ 0 ]

Value of $100 Bills     [ 0 ]            Value of $10 Coupons    [ 0 ]

Value of Coins          [ 0 ]

Total Cash Amount:      $0.00
Total Coin Amount:      $0.00
Total Checks Amount:    $0.00
Total Coupons Amount:   $0.00            Date of Sale            [ 12/15/2005 ]
Total Deposit Amount:   $0.00

[ <<BACK ]  [ CALCULATE ]   [ CLEAR ALL ]  [ FINISHED ]

Fig. 10

DTS Deposit Slip Creation

| DTS LOGO | | | | |
|---|---|---|---|---|
| HOME | CREATE | MANAGE | REPORT | ADMINISTRATION | HELP |

DTS Deposit Wizard
STEP ❶ ❷ ❸ ❹

Messages

Messages

Company Name
Store Name
Sales Date: 1-10-2005                    1-10-2005

Cash:                                     $255.00
Coin:                                      $22.08
Checks:                                    $85.15
Coupons:                                   $16.00

Bank Name
Bank Vault Name          Total:           $378.23

Transaction Number: Bag Number : MICR Number  Deposit:

2D Barcode

| PRINT | CREATE ANOTHER DEPOSIT |

Fig. 11

DTS Search Criteria

| HOME | CREATE | MANAGE | REPORT | ADMINISTRATION | HELP |

Track Deposits

| Type | Description | Criteria | | Search |
|---|---|---|---|---|
| Sales Date | Displays transactions that occur between two dates that you specify based on sales date. | Start Date: 1/11/2005<br>End Date: 1/13/2005 | | >> GO |
| Prepared Date | Displays transactions that occur between two dates that you specify based on deposit location. | Start Date: 1/11/2005<br>End Date: 1/13/2005 | | >> GO |
| Status | Displays transactions that occur between two dates that you specify based on deposit status. | Start Date: 1/11/2005 End: 1/13/2005<br>Select from Drop-Down | | >> GO |
| Location Number | Enter a location number and transaction information will be displayed. | Location Number: | | >> GO |
| Bag Number | Enter a bag number and transaction information will be displayed. | Deposit Bag Number: | | >> GO |
| Deposit Number | Enter a deposit amount and transaction information will be displayed. | Deposit Total Amount: | | >> GO |
| Transaction Number | Enter a transaction number and transaction information will be displayed. | Transaction Number: | | >> GO |

<<BACK    PRINT

Fig. 12

DTS Administrative Set-up Screen

DTS LOGO

| HOME | CREATE | MANAGE | REPORT | ADMINISTRATION | HELP |

Company Setup

Company Names — Company Name
Corporate ID — ID Number
Customer Identifier — Customer Identifier #
Days Until Passwords Expire — Number of days
Default Sales Date — Select from Drop-Down List ▼

CANCEL    SAVE

Fig. 13

DTS Administrative Set-up Screen

| DTS LOGO | | | | |
|---|---|---|---|---|
| HOME | CREATE | MANAGE | REPORT | ADMINISTRATION | HELP |

Add Location Information

Company — Select from Drop-Down List ▼

Location Name

Location Identifier

Location Number

Third Party Identifier

Account Identifier — Select from Drop-Down List ▼

MICR Serial Format — Select from Drop-Down List ▼

Sales Date Display

Account Identifier — Select from Drop-Down List ▼

Deposit Process — Select from Drop-Down List ▼

Financial Institution — Select from Drop-Down List ▼

Vault Process — Select from Drop-Down List ▼

[CANCEL] [SAVE]

Fig 14

DTS Administrative Set-up Screen

| DTS LOGO | | | | |
|---|---|---|---|---|
| HOME | CREATE | MANAGE | REPORT | ADMINISTRATION | HELP |

Add User

| Username | | Address | |
| First Name | | Address (cont) | |
| Last Name | | City | |
| Email | | State (Ab.) | |
| Title | | ZIP | |
| Phone (work) | | Role | Select from List ▼ |
| Phone (Mobile) | ☐ | Locations | Select from List ▼ |
| Email Username? | ☐ | User Type | Select from Drop-Down List ▼ |
| Email Password? | | User View | Select from Drop-Down List ▼ |
| Time zone | Select from Drop-Down List ▼ | | |

[CANCEL] [ADD USER]

Fig. 15

DTS System Updating

| DTS LOGO | | | | |
|---|---|---|---|---|
| HOME | CREATE | MANAGE | REPORT | ADMINISTRATION | HELP |

Status Update - Keyed

○ Received   ○ Credited   ○ Verified (Discrepancy)

Transaction Number [_____]

Update

Fig. 18

DTS Report Sample

Deposit Tracking System
Prepared Deposits
Report Dates: 1/11/2005 – 1/13/2005
1/13/2005 9:35am

DTS LOGO

| Location | Number | Transaction | Sales Date | Prepared | Received | Verified | Deposit |
|---|---|---|---|---|---|---|---|
| Morehouse | 2564 | CA1315DJA1 | 1/12/2005 | 1/12/2005 | 1/13/2005 | | $5,000.00 |
| Morehouse | 2564 | CA4315EJA4 | 1/11/2005 | 1/11/2005 | 1/12/2005 | 1/122005 | $9.000.00 |
| Morehouse | 2564 | BA1615LJA1 | 1/11/2005 | 1/11/2005 | 1/12/2005 | 1/12/2005 | $8,743.12 |
| Morehouse | 2564 | CA1315DJA1 | 1/10/2005 | 1/11/2005 | 1/11/2005 | 1/11/2005 | $1,802.00 |
| Morehouse | 2564 | CA1315DJA1 | 1/10/2005 | 1/10/2005 | 1/11/2005 | 1/11/2005 | $5,524.00 |

Total for Above Location

Fig. 19

Tag　　Antenna　　Reader　　RFID Middleware

Typical DTS Parallel Vault Process

Option Number One

Option Number Two

Note: Option One is designed for locations where each processing station has Internet access and will use that workstation to update the status of deposits.

Option two is designed for locations that will use a shared station to update deposit statuses.

Deposit Flow (Physical) – Level 1-2-3 Data

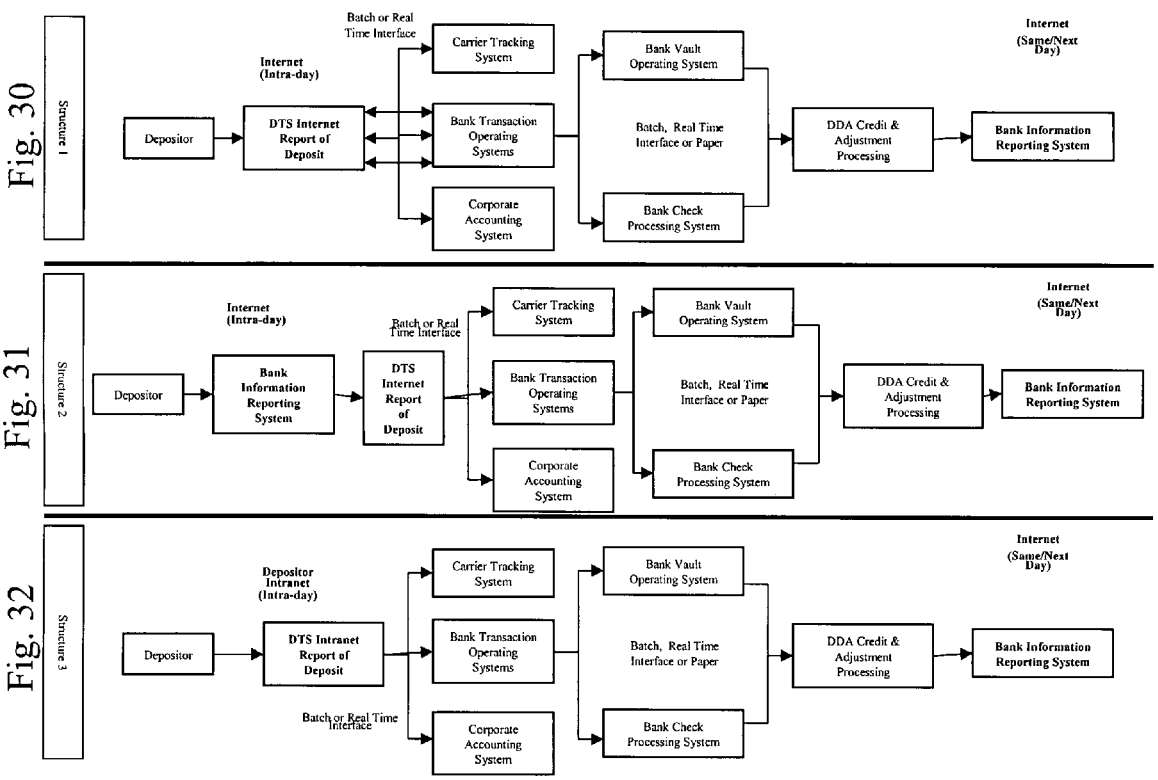

SYSTEM AND METHOD TO CREATE ELECTRONIC DEPOSIT RECORDS AND TO TRACK THE STATUS OF A DEPOSIT

The Applicant claims the benefit of U.S. application Ser. No. 60/502,284 that was filed on Sep. 12, 2003.

This invention is directed to an improved system and method for depositing money from entities that receive cash and other instruments, such as retail establishments and service organizations, to banks or other financial institutions.

FIELD OF THE INVENTION

This invention relates to a system that enables banks and their customers to create deposit records for both cash and other instruments, quickly transfer those records among users, update the deposit and account records depending on the status of the deposit, provide electronic receipts for deposits and to track the location and status of a particular deposit.

BACKGROUND OF THE INVENTION

At the end of a business day, or upon other predetermined time intervals, a business will assemble their monetary receipts, count the receipts, fill out a deposit slip and then will transfer the receipts and deposit slip to a bank. Upon reception of the receipts, a bank then divides the cash portion of the deposit from the checks (or other instruments), counts the receipts and provides a reconciliation between the amount that was reported on the deposit slip and the amount that was received by the bank. The bank then provides to the customer a credit to the account and a receipt acknowledging its reception of the customer deposit. In the event the amount that was received is consistent with the amount that was reported on the deposit slip, the entire deposit is credited to the respective account. If there is a discrepancy between the amount reported on the deposit slip and the amount received by the bank, the bank may credit the amount it has determined it has received and customer is contacted and advised that the reported amount on the deposit slip does not match the amount the bank received. The bank and customer will then reach a resolution with respect to the discrepancy Because many of the steps involved in a conventional deposit process are manually performed, there are numerous instances where errors can be manifested in the transaction. For example, during the customer counting process, the amount of the currency may be incorrectly calculated. Even if the count is correct, the amount that is reported on the deposit slip may be incorrectly transcribed. Further, errors may arise in connection with the identification of the particular customer account that may lead to incorrect crediting of accounts. For example, if a customer incorrectly enters the account number, the bank may identify this initial error. However, because many customers may have similar names, the incorrect account may still be credited by bank personnel. Errors may arise due to miskeying of account information by bank personnel. Further, in the conventional process, the existence of the error may not be discovered until after significant time has elapsed.

In the conventional process, upon completion of the deposit slip, the deposit slip is then associated with the customer deposit that is transferred to suitable container such as a bag or parcel and the materials are then transported to a bank, secure lockbox or bank vault operation. In an alternative arrangement the materials may be delivered to a third party cash processor. In the event that the cash receipts are large, the transportation of the receipts may be accomplished by armored carrier. When a conventional deposit package is received by the bank, the bank then counts the deposit receipts, appropriately credits the depositor's account and provides a receipt acknowledging reception of the deposit.

In such conventional deposit operations, many of these functions are manually performed by the customer and bank employees and the transaction remains a labor-intensive process. Even in those circumstances where automated cash counting technology is used, there can be errors that arise in the transfer of the data from one record to another. Because many of the procedures require human intervention, existing practices present a number of opportunities for errors. Further, each procedure in the transaction that is manually performed commensurately increases labor costs and the total transaction time between the time a customer makes the deposit and the time that the customer is credited with the deposit. In circumstances where the cash receipts are large, such as receipts from parking at large events, gate receipts at events, concession receipts, arcade receipts and other cash intensive business such as casinos, racetracks, churches, large retail establishments, grocery stores, and special sale events, such as liquidation sales, any problems or delays with the deposit transaction are magnified. Further, whenever the cash deposit is large, the customer would like to receive credit for the deposit to its account as soon as the bank takes possession of the deposit.

Banks, savings and loans and credit unions are subject to numerous federal and state regulations that govern their operations. In addition to the government-mandated requirements of cash reserves, banks must also anticipate the amount and type of currency that will be required for expected transactions within a certain time-period. The quicker that a bank can credit deposits, the faster the capital is available to fund its operations. Cash that is quickly accounted for can also be counted against requisite cash reserves. In general, a bank wants to keep its cash reserves at low levels because the cash is not functioning as working capital when it is in ready cash reserve.

In connection with checks, banks are required to process, and clear checks within defined time-periods. A rapid identification of the checks drawn on the bank's own customers, local competing banks or banks from other regions of the country would increase the speed of the clearing process. The requirements for clearing checks depend on the region in which the payee bank is located and the payee on the check. For example, checks to business have different requirements than checks made payable to individuals. Currently, after a bank customer deposits checks with his or her bank, the bank typically transports the check from the branch or automated teller machine, where it was deposited to a central operations center. The checks are then sent to a first intermediary—such as a Federal Reserve Bank, a correspondent bank or a clearinghouse—for collection. Next, the checks are delivered to the bank on which it is drawn for payment. This procedure requires the transport of the check to its respective destination by air or ground transportation. While some banks have entered into agreements to accept checks electronically, sometimes referred to as "truncated checks," in view of the large number of banks in the United States, it is practically impossible for a single bank to obtain agreements from all other banks. Consequently, the check clearing process is a time-consuming and labor-intensive process. While there are a number of automated techniques that have been adopted that have increased the speed of the process, including the use of MICR coding, to the extent that other aspects of the process can be automated the efficiency of the transaction would increase.

While the prior art has disclosed a number of techniques to automate transaction handling, there remains a need to increase the efficiency and accuracy of the deposit transaction process.

An object of the present invention is to increase the speed and accuracy of the deposit transactions, and reduce the labor required to perform the transactions. A further object of the invention is to make information relating to the deposit rapidly available in electronic form to both the customer and the bank. Other objects of the invention include reducing transaction costs, making capital available faster and increasing liquidity. A further object of the invention is to capture data from the deposit process than enables both banks and customers to make better decisions regarding their respective business, identify problematic locations in the deposit transaction, identify potential theft, fraud or embezzlement quicker, and identify industry trends.

SUMMARY OF THE INVENTION

The present invention is directed to a system that includes a computer network for operating a program on which a user can create an electronic deposit ticket and then track the status of the deposit based upon additional input from the bank or third party carrier. When the deposit has been credited to the bank, the bank may use the system to create an electronic receipt and notify the depositor of the credit and any adjustment by electronic mail. The program is designed to create a machine-readable code that is then associated with the customer's physical deposit that may include currency, coins, checks and other instruments. The code contains all of the information captured during the creation of the deposit slip including information relating to the operator, the entire contents of the deposit, the time of the creation of the deposit and other customer identification information. The system includes equipment designed to read the code at predetermined steps in the deposit process, such as reception by a third party carrier, reception of the deposit at the bank's receiving location and reception by the bank's vault operation. Information from the machine-readable code may be used to update data about a location, status of the deposit, and the bank employees may use the information and the system to prepare its records of the receipt of the deposit, and its reconciliation of the reported amount and actual amount received. Because the information is made available over a network, the deposit tracking aspect of the invention can provide both banks and its customers with real time information regarding the status of a customer deposits. Moreover, the data captured can be used to improve the efficiency of the deposit transaction process.

BRIEF DESCRIPTION OF THE DRAWINGS

FIG. 3 is a depiction of a typical data entry field that a customer can enter data regarding its identity and gain access to the deposit system.

FIG. 4 is an illustration of another data entry field wherein a customer can create a new deposit record and enter data regarding a deposit transaction.

FIG. 5 is an illustration of a data output prompt screen that depicts machine-readable code containing information relating to the deposit.

FIG. 5a is a sample deposit slip that was created using the system of the invention.

FIG. 6 is an illustration of a data field depicting an output in response to a search request to the deposit tracking system according to the invention.

FIG. 7 is an illustration of a data field depicting an output in response to a second search request to the deposit tracking system according to the invention wherein there was a discrepancy between the amount reported on the deposit slip and the amount confirmed by the financial institution.

FIG. 8 is a screen shot of a data field for input for creating a new deposit record and deposit slip.

FIG. 9 is a screen shot of an output of the system during the deposit slip creation process, wherein the data entered by the user did not conform to the pre-selected parameters.

FIG. 10 is a screen shot of an output of the system during the deposit slip creation process, wherein the data entered by the user did not conform to pre-selected parameters.

FIG. 11 is a screen shot of an output of the system during the deposit slip creation process, wherein the data entered by the user is displayed in a summary deposit slip and is ready for printing by the deposit slip creator.

FIG. 12 depicts a bank customer screen display depicting the search features of the features of the invention.

FIG. 13 depicts a bank customer screen display depicting a data input screen wherein a customer is gaining access to the system.

FIG. 14 depicts a bank customer screen display depicting one of the features of the invention where new locations may be added.

FIG. 15 depicts a bank customer screen display depicting one of the features of the invention where new users may be added.

FIG. 18 depicts a bank customer screen display depicting one of the features of the invention wherein the input is keyed and the status of a deposit is monitored.

FIG. 19 depicts a screen display depicting one of the features of the invention wherein a report may be generated regarding the status of the deposit.

FIG. 30 is a first embodiment of infrastructure depicting data flow in a system employing the invention.

FIG. 31 is a second embodiment of infrastructure depicting data flow in a system employing the invention.

FIG. 32 is a third embodiment of infrastructure depicting data flow in a system employing the invention.

DETAILED DESCRIPTION

Figure 1:
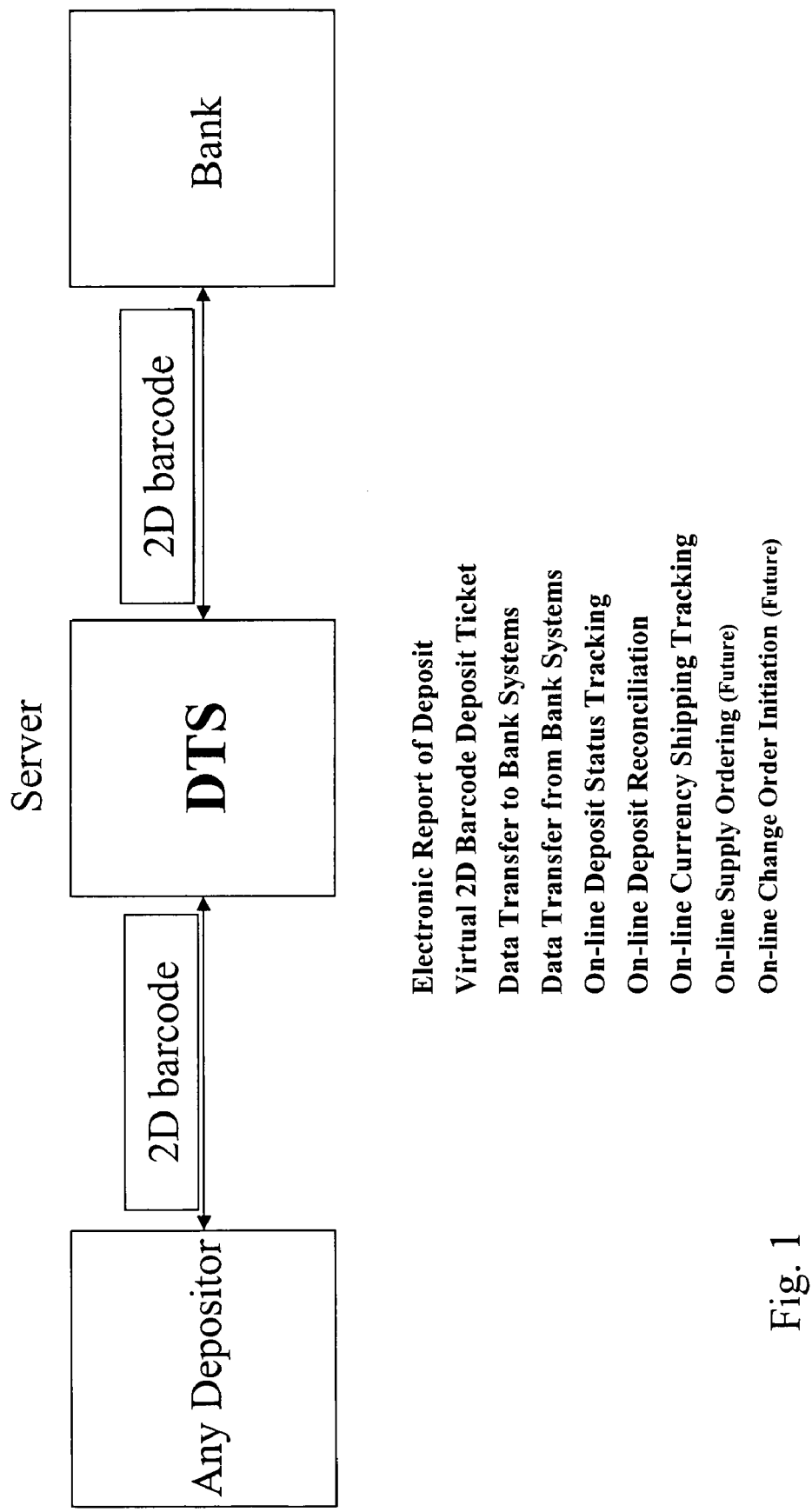
FIG. 1 is a schematic representation of the overview of the system of the invention.
Figure 2:
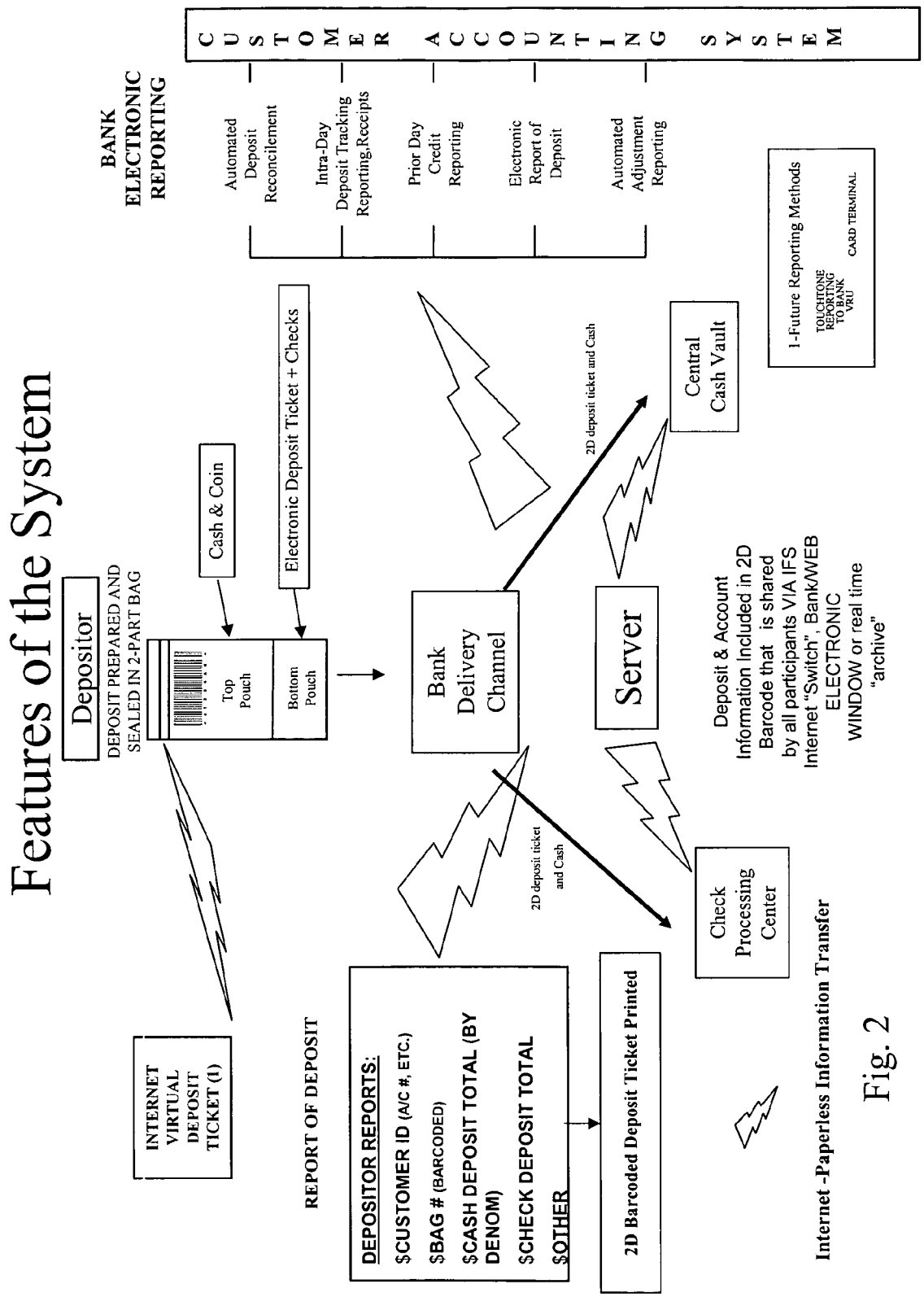
FIG. 2 is a schematic representation of the system of the invention showing some of the features of the system.

Now referring to FIG. 1, the present invention is directed to a system and method that involves the creation and dissemination of electronic data relating to a deposit transaction. The system involves an employment of a network of devices that can be implemented using the Internet, or other networking structures such as local area networks or wide area networks. As seen in FIG. 2, the system includes data entry devices for the creation of the deposit information at a customer location, the creation of receipt records at a bank location and devices to read the machine-readable code. In a preferred embodiment, the code that is created is a two-dimensional "(2D)" bar code that can be read using an optical scanner. Generally, two-dimensional code stores information along the height as well as the length of the symbol and many types are commercially available. In an alternative embodiment of the invention, the deposit information is encoded on a radio frequency identification tag.

In a preferred embodiment the two dimensional code employed is PDF417 which was invented by Ynjiun Wang and assigned to Symbol Technologies, Inc. This code, now in the public domain, allows for between 1000 to 2000 characters per symbol with an information density of between 100 and 340 characters. Each symbol has a start and stop bar group that extends the height of the symbol. PDF417 code can be read with modified handheld laser or CCD scanners. Conventional commercially available high-density printers can be used to print the symbols. The program for PDF417 allows the user to rapidly manipulate PDF417 parameters such as number of rows and columns, error correction level, etc. to customize the symbol for the desired application. Further information regarding PDF417 is available at the Symbol Technologies Internet site and in U.S. Pat. No. 5,243,655.

An alternative bar code technology is Codablock which is a stacked symbology available from ICS Identcode-Systems. This code originally involved a stack of Code 39 symbols and each Codablock symbol contains from 1 to 22 rows. The number of characters per row is a function of the x-dimension of the symbol. In this arrangement, each row can contain a variable amount of characters, each symbol has a start and stop bar group that extends the height of the symbol, each row has a two character row indicator, and the last row of the symbol has an optional check digit. In this code, the symbol printing program must calculate not only the number of rows needed as in the other stack symbologies, but also calculate the number of characters per row and the print density necessary to best fit the data into the Codablock symbol. The code is a continuous; variable-length symbology that can encode the Code 39 character set (10 digits, 26 letters, space, and 6 symbols) and is no more dense than a Code 39 symbol at a given print density. The current version is Codablock F which is basically a stack of Code 128 symbols. A Codablock F symbol consists of between 2 and 44 rows, each up to a maximum of 62 symbol characters wide. Each row can be read by a standard code 128 reader and contains additional overhead information relating to row numbering and symbol size to enable the decoded output from each row to be re-assembled to reproduce the complete message in the right sequence. One advantage of the Codablock technology is that it can be read by moving beam laser scanners with very little modification.

Yet another two-dimensional code, Code 49, is available from Intermec Technologies Corporation, 6001 36th Avenue West Everett, Wash. 98203-9280. Code 49 uses a series of bar code symbols stacked one on top of another. Each symbol can have between two and eight rows. The rows consist of a leading quiet zone; a starting pattern; four data words encoding eight characters, with the last character a row check character; a stop pattern; and a trailing quiet zone. Each row encodes the data in exactly 18 bars and 17 spaces, and each row is separated by a one-module high separator bar. The code is a continuous, variable-length symbology that can encode the complete ASCII 128-character set. Its structure can be described as a cross between UPC and Code 39. This code is now in the public domain and labels can be printed by standard printing technologies.

To scan Code 49 one may employ a modified moving beam laser scanner or a CCD scanner. Scanners are available from Intermec which will decode Code 49 symbols along with standard bar code symbologies.

A further two dimensional code is known as Datastrip Code, originally called Softstrip, Datastrip Code was developed by Softstrip Systems and now owned by Datastrip Inc. It is a patented encoding and scanning system that allows, data, graphics and even digitized sound to be printed on plain copy paper in a highly condensed format and read error-free into a computer. Datastrip Code uses printed graphic patterns (the Datastrip) and electro-optical readers. The Datastrip Code consists of a matrix pattern, comprising very small, rectangular black and white areas (or DiBits). A series of markers on the side and top of the strip (start line, checkerboard and rack) provide alignment information for the readers to ensure data integrity. Header information contains details about the data stored on the strip: file name, number of bytes, density of the data strip, etc. The Datastrip encoding method, which includes parity bits on each encoded line, offers reliable reliability and error correction capabilities.

Most two dimensional coding technology including Datastrip Code can be successfully produced by most types of dot matrix, laser (including very high speed centralized laser printers), ink jet or thermal printers. Further, the codes can be reproduced on most types of paper (including newsprint) and plastic, using conventional printing processes, ranging from office photocopiers (for lower density strips) to high speed web presses. Low density strips (up to 1,100 bytes per 9-inch strip) may be produced on most dot matrix printers. Strips containing up to 3,500 bytes can be produced using laser printing technologies. Datastrip Code can only be read by readers available from Datastrip, Inc. and the reader must be in contact with the code. Originally, this code was promoted as a way to publish software in books and magazines in a machine-readable form. The code is currently commonly used for printing information on ID cards. This coding technology is further described in U.S. Pat. Nos. 4,692,603; 4,728,783; 4,754,127; and 4,782,221.

Other bar code technology includes include Aztec, Datamat (DataMatrix) and Maxicode. In addition to the scanners described above, commercially available scanners that can capture and interpret code are available from a number of sources including: Symbol Technologies, Inc., HHP (Hand Held Products) and Zebra. Commercially available software allows for the creation of encoded information that is then made available for printing by the user. In a preferred embodiment of the invention, a user prints the code along with a paper deposit slip and then associates the code and paper receipt with the deposit. The slip that contains the information is then inserted into a pouch that is attached to the deposit container that has a transparent window to enable the scanning of the data and reading of the information without removal of the deposit slip. The deposit record is then stored in a database. In the preferred embodiment, the customer is also provided with access to its account information on the bank's server. The bank's processor converts the data according to a program controlled by the bank's processor and allows the customer to download the bar code and other deposit information.

As illustrated in FIG. 3, according to the invention, in a preferred system of the invention, each customer may access the system using a personal computer or mobile device such as a personal digital assistant or mobile phone that communicates with a server containing the software and data regarding the account via a communications link such as the Internet. The customer is then allowed access to a log-on display screen where it may enter a unique account and customer identification number that enables the customer to gain access to the system. Next, as depicted in FIG. 4, the customer may create an electronic deposit record by entering data regarding the contemplated deposit into the system. In the preferred embodiment, the data entry fields include separate tables for cash deposits and check deposits. Further separate data entry fields are also provided for each currency denomination, ones, fives, tens, etc. An electronic calculator associated with the program will automatically calculate the total dollar value of each denomination and provide a sum total for the entire cash deposit. The data fields for check deposit information may include the check number, the amount or the check and information relating to the bank on which the check is drawn. Separate totals are provided for both cash and non-cash receipts. When the user has completed the data entry, he or she is prompted to confirm the information and commit to the deposit transaction. Information regarding the deposit, including all information relating to the identity of the depositor, the time, the date and the contents of the deposit is then encoded on the machine-readable code that is associated with the deposit account. FIG. 5 illustrates a display screen in which the user is then prompted to print the completed deposit slip. FIG. 5A is an example of a printed output deposit slip that includes the customer identity, and the totals of the cash, coins checks and coupons deposit. At the bottom of the deposit slip a two dimensional bar code is depicted that includes detailed information regarding the deposit.

Further contemplated features of the invention include the activation of certain functions depending on the user input to the deposit slip field. For instance, in the event that the cash receipts exceed a predetermined value, a prompt function can notify the user that the deposit should be affected by armored carrier. In another alternative, when receipts exceed a predetermined amount, further entry of data is inhibited and the user is prompted to close the current deposit slip and create a new slip for additional monies. For security reasons, the deposit can be divided into separate transactions and be transported by separate carriers. In another contemplated embodiment, completion of the deposit slip can automatically notify a carrier of a pick-up depending on the value of the cash. In yet further contemplated embodiments, the software may instruct the users to follow certain customer-specific handling procedures depending on the amount of the cash receipts. For example, as discussed above, the deposit ticket may only accommodate a certain maximum cash amount and require additional cash receipts to be deposited in a separate deposit transaction and using a separate transportation carrier. A further optional function is to provide independent verification of the deposit at the source. For example, based upon other predetermined data input, the system may set forth a prompt requesting that the transaction be witnessed by more than one employee. Yet a further feature is to provide a prompt for the user to close the deposit record in response to the time of day to ensure that some portion of the receipts be delivered to the depository before the close of the business day of the bank. Yet a further contemplated feature is if the amount of the receipts exceeds a predetermined amount, the bank may request that the deposit be routed to its cash vault operation rather than a branch location and the user is accordingly instructed by a prompt.

Since the information regarding the putative deposit is immediately made available to the bank, one feature of the system includes an alert function to the bank that a deposit slip record has been created and a deposit transaction has been initiated. In the event that amount of the cash receipt(s) exceeds a predetermined level, the bank is notified so that the bank can have adequate resources to handle the incoming deposit at the cash vault on a timely basis. While the foregoing examples are illustrative, one skilled in the art will appreciate the present invention assists in the implementation of both bank specific and customer specific internal operating procedures.

In one scenario, after the deposit slip has been created and associated with the container, the deposit package is then physically transported from the user's location to the bank's designated deposit location. When the deposit package is received by the bank, the label or tag is scanned, thereby providing verification that the bank is in possession of the deposit package. The deposit location is typically at a bank branch, a vault operation, or a drop vault. When third party transport is employed, the transport company can also be provided with scanners that will scan the data from the deposit slip and thereby the companies' receipt and transfer of the deposit bags may be tracked. In an alternative embodiment, when the deposit is first made to a drop vault, the machine-readable code is scanned at the time the deposit is placed in the drop vault and when it is removed from the drop box and transferred to the transport vehicle. At each instance the information is scanned, the data is processed and then transmitted to the electronic database. This data transmission can be performed using a wireless system or by using scanners that directly communicate with the electronic tracking system data. Each time the bar code is scanned the transaction record is updated, including information such as the time of the scan, the individual operating the scanner and the identity of the location of the scan. Since the customer has access to this updated information, the customer can monitor the status and location of the deposit without directly communicating with bank personnel. Allowing such data access to the customer reduces the number of customer inquiries regarding the deposit status. Further, the system makes it possible to credit the depositor's account immediately upon the bank's possession, or constructive possession of the deposit.

When the deposit package arrives at the bank's designated deposit location, it is once again scanned. The scan at the bank location can thereby provide information that the deposit has been transferred from the transport company to the bank. When the bank makes this scan, it begins the creation of its receipt documentation by electronically capturing the identity of the depositor, the account number and other information relating to the deposit. Since the deposit information contains detailed information with respect to the contents of the deposit, the cash manager can use the information to assist in determining the cash needs of the bank. Accordingly, by capturing the information on the two dimensional code, the bank can significantly reduce its input function.

Next, the bank divides cash receipts from the checks and forwards the cash receipts to the bank's vault operation. Checks are forwarded for the clearing process and the cash is processed according to the procedures outlined above. When the cash receipts are received by the vault operation, the deposits may once again be scanned thereby indicating that the vault operation is in position to count the deposit. Because the bank may have confidence in the information from trusted depositors, the bank can credit certain accounts and then count and verify the deposit at its convenience. Once the count is complete, the bank can further update the electronic receipt and provide the status of the deposit. If the bank's count agrees with the amount on the deposit ticket, the customer's account can be immediately confirmed and the cash is then made available to draw upon or to otherwise encumber. In this regard, the bank can communicate to its customers that it credited and confirmed the credit using an electronic receipt system. This communication can be effected via an electronic mail to the customer initiated by the bank when the transaction is complete, or the information may be merely posted to the electronic deposit tracking system so that the customer may view the status of the account or both. The adoption of this electronic receipt system can reduce mailing, postage and handling costs to the bank.

Since the information regarding the source of the deposit can be quickly scanned, the speed of the transaction is increased and mistakes are reduced. Faster reception and credit of deposits improves efficiency and can reduce costs. By scanning in the deposit information, the receiving efficiency in both the cash vault and check processing operational environments is increased. A bank can significantly increase the efficiency of the cash vault (or out-sourced vaults), check processing receiving areas using the electronic deposit ticket bar code scan capability, and thereby replace the existing manual operation of manifesting and counting individual deposit bags. Eliminating this receiving bottleneck at the bank can more evenly distribute workflow and lower total resource requirements. Quicker receiving procedures at the bank will also reduce daily deposit holdover volumes. Faster receiving also results in less armored carder aid ground courier waiting time, which serves to further reduce operating costs. Faster bank deposit receiving can result in quicker credit to the depositor's account thereby improving funds availability. This enables increased cash utilization.

In addition, the system may help identify deposit bags that have been disassociated with the deposit slip. The system may also help quickly identify any problems in the deposit process including theft, embezzlement, and accidents by providing timely information relating to the status of a deposit. If information from the deposit is not timely received, remedial steps to locate the deposit package may be rapidly implemented.

The system of the invention also makes more information available to the customer thereby improving customer service and reducing the costs associated with responding to customer account inquiries. In addition, the invention provides depositors timely deposit processing status reports and provides other data in electronic forms, such as credit receipts that can be integrated with the customers existing accounting software.

Because the customer enters deposit data electronically, including the entire customer profile (direct deposit account number, location number, address, processing instructions, etc.) and the data is loaded into the 2D barcode that is printed on the deposit document, bank personnel (or out-sourced vault personnel) no longer have to key enter the deposit data. In addition to the information that the customer enters, other information is captured by the program such as the time and date of the creation of the deposit slip record. The initial reception of the deposit by the bank only involves scanning the barcode or other machine-readable code. Because the data entry step is removed at the deposit location, errors may be eliminated and, as a result, operational productivity is increased. Increased productivity in turn will lower deposit-processing costs for the bank. If individual check data is also included in the barcode, it can be used to power-encode the dollar amount.

A contemplated alternative embodiment to providing the information relating to the deposit on a bar code is to employ radio frequency identification (RFID) technology. RFID enables any product or device having an RFID tag to be uniquely identified at any point during transport without using line of sight scanner devices. RFID tags include an integrated circuit and an antenna. RFID tags may be active or passive. Passive tags, which are the most common, do not include a battery and are powered by electromagnetic waves emitted from the tag reader. They typically have ranges of approximately three meters. When the integrated circuit and antenna of the tag enter a field created by the reader antenna a magnetic field is created. The magnetic field is then used to provide power to the chip using this inductive coupling thereby enabling it to transmit or store data. Energy that is generated by the field is used by the tag to back a signal to the antenna. The antenna then converts the signal to a digital signal that is transmitted to RFID system middleware. The middle where can then confirm the information contained on the tag with the information about the deposition that was entered on the system. The middleware processes the information from the readers and updates the information of the deposit tracking system software.

Active tags employ a power source and are therefore typically larger and more expensive. One advantage of active tags is that they increase the range of the operation of the tag. They may also be programmed to periodically transmit signals that may be read by remote antennas. Active tags are generally more expensive and have capabilities to transmit signals distances of 100 feet or more. Semi-active tags also have a battery. They differ from active tags because the battery is used to run the microchip circuitry and not to power communications with the reader.

RFID tags may be read-only, read write or some combination. For example, each tag may have certain identification information that is permanently stored and a portion is available for storing information.

In a preferred contemplated embodiment, a passive RFID a tag is encoded with the deposit information at the customer location and associated with the deposit package. The information then can be scanned by an antennae rather than a line of site bar code. Readers for RFID tags may be handheld or may be integrated into a wide variety of gates or portals. For example the threshold of a door may be fitted with an antenna that can read any RFID tags that pass through the portal. The signal from the antennae is transmitted to a processor for decoding the signal. The range and speed of data transmission from the RFID tag is dependent on the frequency, the antennae size, the power output and potential interference.

Figure 20:
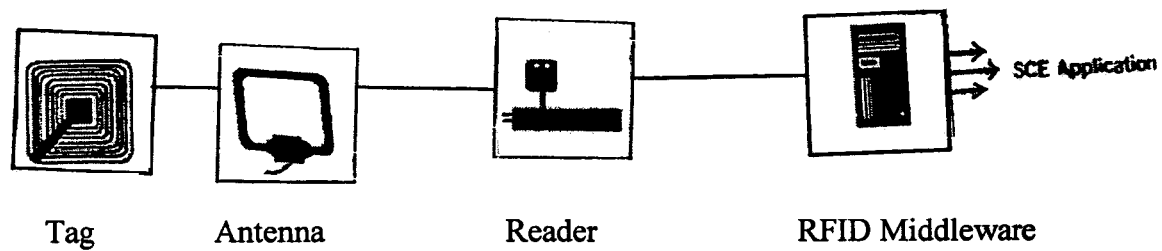
FIG. 20 is a schematic representation of an alternative embodiment of the invention showing the components of an RFID system that are used to store the machine readable information.

Like bar code scanners, the information in the tags may be accessed at predetermined locations and times that enable both the bank and the customer to track the deposit from the point it leaves the retail establishment, during various stages of transit, the time the deposit is received by the financial institution, to the time it is passed into the vault facility for processing. RFID enables the transmission of such information without physical contact with the product and can accommodate multiple tags and simultaneous signals. While the tags and readers operate at multiple frequencies including low frequency (approximately 125 KHz), High Frequency (13.56 MHz). The preferred frequency for the present invention is UHF (860-930 MHz) which enables signal reception at distances up to three meters. The UHF signals also operate at greater speeds than HF signals. For example, using a tag in the UHF range, a truckload of deposit bags can be quickly picked up at a location by an armored carrier and scanned at the rear doors as they are rapidly loaded into the cargo area. The deposit parcels are then scanned as they are removed from the cargo area and at a location in the bank. In an alternative example, a deposit bag dropped in an unmanned drop vault is scanned by the reader as it is received in the vault. This allows deposits and confirmation of the deposit 24 hours a day. RFID tags, RFID scanners and middleware are commercially available from inter alia Matrics, Inc. 8850 Stanford Blvd, Suite 3000, Columbia, Md. 21045; Alien Technologies Corp., Inc.; Morgan Hill, Calif., Philips, and Texas Instruments, Readers are also available from Intermec Technologies, and Symbol Technologies. FIG. 20 schematically depicts the elements of a RFID system including the tag and reader.

In summary, the system will assist in reconciling deposits, detecting errors, and consolidating deposits that were time consuming and prevented both the bank and customer from focusing on critical strategic business functions. The present system provides for automation of these tasks. Moreover, the system is designed to reconcile deposits from multiple locations into a single account. Further, The deposit tracking system automatically adds each deposit type entry ensuring fewer calculation errors. In addition, the deposit tracking system eliminates the need for adding machines, tapes, etc. Barcode data transfer is more accurate than key entry reducing carrier or bank transcription or handwriting reading errors.

With respect to the bank, once the deposit is verified by the bank's vault operation, the vault operating system and deposit-processing systems will update the deposit tracking system database described herein with current deposit status (received, verified, or verified with discrepancy). As discussed above, once the deposit transaction is complete, an electronic deposit receipt is available to the depositor via the deposit tracking system website, eliminating the need for mailed paper deposit receipts. In an alternative embodiment, the receipt is electronically mailed upon completion. The invention will eliminate the cost of mailing receipts such as materials (paper, envelope) postage costs and labor. Multiple receipts from multiple sources can be reported in a single comprehensive report.

A further advantage of the invention to the depositor is that same day deposit reporting and electronic deposit receipting enables daily deposit reconciliation. In past practices, depositors would have to wait until the end of the week or the end of the month when the store and bank deposit files are received. The rapid dissemination of this information allows discrepancies to be researched immediately reducing out-of-balance and un-reconciled deposit balances. The rapid access to information can also minimize losses due to employee theft, embezzlement and fraud and can assist managers in connection with purchasing and inventory decisions.

Because the deposit tracking system data can be downloaded, the depositor can quickly identify deposit problems by location or by carrier. Also, a retailer's corporate cash management office can identify the deposit status of all locations whether prepared, bank received (and carrier received if carrier updates the deposit tracking system), bank verified and discrepancy reporting.

The system provides advantages to the bank because customer deposit data is available immediately to the bank which can then determine same-day operations staffing levels and cash vault inventory requirements. If the reported deposit transaction volume is lower than anticipated, bank operations management can reduce capacity on a real-time basis, thereby lowering its operating costs. Conversely, in the event that the reported transaction volume is higher than expected, the bank can take the necessary steps to quickly process the transaction.

As described above, the electronic deposit ticket includes a 2D bar code feature that is created on the users' interface. The bar code has encoded thereon all of the information from predetermined areas of the input screen including deposit information by denomination. As a result, the bank (and any out-sourced locations) can modify federal deposit cash supply orders accordingly, reducing overall inventory levels and cross-shipments. Moreover, lower currency inventory levels reduce the associated costs of this non-earning asset. Reported cash (accessible within 24 hours) may be able to be used against Federal Reserve requirements.

A further advantage to the system is that the depositor is quickly provided detailed information regarding the deposit. Because customer deposit information is available by deposit type (cash, check, etc.), the corporate controller or cash manager can make borrowing decisions or invest sooner. Advanced credit upon receipt by the bank can also accelerate investable funds. Software from the system can easily track same store deposits or quickly compare the deposit actively by store. In the event that an expected deposit is not received within a predetermined time, after the creation of the deposit, a notification can be sent alerting the customer and the bank of the potential problem. This enables quick action to try and solve the problem if necessary or, if there is a suspicion that the deposit has been improperly diverted, stolen or embezzled, remedial action and loss recovery steps may be timely implemented.

Yet a further advantage of the invention is that it may lower the customer service fees for banks. Under current systems a customer that wants access to information regarding his or her account was required to perform the transaction by phone, thereby increasing the time and labor involved for investigating information requests. The electronic deposit system allows customers access to information regarding their transaction quickly without the use of bank resources. Moreover, customers access and view their deposit status on-line, including detailed discrepancy information. An on-line search capability (by amount, date, bag number, deposit status, transaction number) enables depositor "self-customer-service" 24/7, reducing the number of telephone calls to be serviced by bank personnel. Better, timely, and more detail discrepancy information can reduce disputes and related bank charge-offs. The search function is illustrated in FIG. 6. A user may search by a variety of inputs including deposit status, transaction number, store location, customer, and bag (or container) number. In response to the search inquiry, the user may review the detailed information on the deposit entry by activation of a link function. FIG. 7 depicts a view of the electronic deposit record after the bank has received the deposit, verified reception of the materials, counted the money and has verified the amount with a discrepancy. In this example, the bank has indicated where its calculations have departed from the customers in connection with its count of coupons.

Advantages of the invention for the depository include a reduction in calls from depositors to the bank for deposit status or discrepancy reasons. Depositors can look on-line, real-time to determine their deposit status and to conduct their own research regarding discrepancies.

The deposit tracking system and electronic deposit ticket are designed to provide for cash only, check only and combined deposits. While the system can be provided in a turn-key or off the shelf software package, it can also be customized to be integrated with existing bank software and incorporate existing bank procedures and operations. Thus since the system is software based and implemented over the Internet it can be customized to provide operational reports to meet any bank's internal requirements as well as customer needs. Further, the deposit tracking system data can be downloaded to a bank's operating or reporting systems for bank manipulation and analysis.

A further feature of the invention involves a time-stamp of the transaction at each data entry point, including the creation of the deposit ticket and the time of each barcode scan. With this data, a bank can more closely monitor operational workflow, determine staff productivity, fine tune staffing models and use this information in other ways to better manage banking operations.

The deposit tracking system provides depositors with a standard deposit reporting, improved and more rapid deposit tickets creation, deposit tracking and a deposit reconciliation system for all their depositing locations. In addition, large retailers can use the deposit tracking system for locations that are outside the bank's service area. The deposit tracking system provides one central deposit tracking and reconciliation system for all depositor locations.

Since most customers have Internet access capability and use the Internet in connection with their operations and business applications, the implementation of the system is easy to install and use through standard Internet browsers. Because the invention can be implemented in a web-based system, it can be implemented without installing any software on the depositor's system. It may also be accessed at any location with an internet connection.

One problem sometimes faced by banks is the receipt of a deposit bag without information relating to the depositor and, accordingly the deposit cannot be matched to the proper account. These are sometimes referred to as "problem bags." With the system described herein, if a bag has a bar code or an RFID tag and it is readable, the bank can determine the identity of the creator of the deposit. Further, since the amount of the deposit has been entered into the system, the bank can match the previously entered summation data with the amount in the bag in order to try to match the depositor with the deposit. Accordingly, the system can reduce the number of mis-applied deposits, reduced research costs in connection with problem bags, and improve customer service. Fewer un-applied or incorrectly applied deposits reduce the number of deposit discrepancies to be researched avoiding customer dissatisfaction.

The invention further allows banks to more accurately price its services. Some banks currently will provide a service charge based upon the value of the deposit. The present system allows banks to base their prices upon the workload of the transaction, not the value. Assessing charges by the number of notes processed instead of dollar value allows banks to more closely match costs with revenue.

A further issue that the invention addresses is referred to as the weekend deposit problem where bank reported weekend deposits do not distinguish between dates (i.e. Friday night, Saturday or Sunday) when the actual deposit was created. The deposit tracking system captures when a deposit is prepared but also allows the customer to enter the "sales date" of the transaction thus allowing customers to easily apply deposits to the day they receive their revenue. The present invention allows banks to credit deposits upon when the bank takes possession of the deposit. A provisional credit can be given to its customers based upon their representation of the deposit.

Now referring again to FIG. 3, the method of the invention involves a depositor logging on the system and entering deposit information including location and shipping information onto the on-line database through the deposit tracking system website. In an alternative embodiment of the invention, the customer can access the deposit tracking system through an internal program The deposit tracking system can then extract the deposit activity at predetermined times throughout the day and transmits to the appropriate depository banks. In yet another alternative embodiment, the customer may enter the deposit and other information through an off-line deposit tracking system software application. In each of the forgoing examples, the system next creates a 2D barcode deposit ticket from the software that contains the relevant deposit data to be scanned by the bank upon receipt.

In the event that a prospective customer does not have computer access, the information can be entered via phone entry system to a call center and the electronic barcode information can be then sent back to the customer via facsimile for including with the deposit package. This feature also enables a customer to proceed with a deposit transaction while a customer's network may not be operable. In yet another contemplated alternative, the deposit data may be entered via touch-tone entry. Like the call center alternative, the deposit document can then be transmitted via facsimile to the depositing location for inclusion in the deposit.

Customer currency and coin only deposit information is entered on-line through the deposit tracking system website. The deposit media type (cash only, check only, coupon only, etc.) available to each depositing location is based upon the specific user identification profile.

As best shown in FIG. 8, the electronic deposit ticket deposit data entry view provides entry of currency by denominations ($1s, $2s, $5s, $10s, $20s, $50s, $100) by count (number of bills), by amount (total value), by summary total. Likewise, entry of coin deposits can be by count, by amount and in summary total. Additionally, the data entry view can include standard FED strap quantity or deposit envelope information input.

Customer check deposit information may also be entered on-line through the deposit tracking system website. In a preferred embodiment, the electronic deposit ticket data entry view provides entry of check deposit summary total information. Additional individual check information including dollar amount, check number, routing transit number, etc. fields can also be provided through customer entry using their keyboard or MICR reading device.

The system can also accommodate coupons, such as food stamps that are redeemed at banks. The electronic deposit ticket data entry view provides entry of coupons by individual coupon amount or summary total. Customer combined (currency, coin, check, coupon) deposit information is entered on-line through the deposit tracking system website.

Other deposit subsets, such as deposit envelope, cash drop, and other internal depositor information requirements can be included in the data entry view on a customized basis.

Deposit Information Quality Control, Review & Correction

As depicted in FIG. 9 (a screen shot of the deposit entry field), the system employs an on-line calculator that totals the deposit data by deposit type (cash, checks, etc.) and provides a grand total. This on-line calculator feature may reduce data entry errors, and, because accurate deposit data is included in the scanned electronic deposit ticket 2D barcode, handwriting, reading, and transcription errors are virtually eliminated. The electronic deposit ticket data entry field also contains basic data entry quality controllers that further reduce depositor errors. For example, a standard electronic deposit ticket feature does not allow the depositor to enter cents for note denominations (entries to the right of a decimal point) or to enter an incorrect multiple of a specific denomination. The deposit tracking system will allow the user to enter incorrect denomination field data but will return an input error message requiring user correction prior to completing the transaction entry). Accordingly, for example, the entry field for twenty-dollar bills will not accept entries beginning with odd numbers or ending with any number other than zero. An error message will be displayed wherein the deposit data fields that need to be corrected are highlighted in red. An example of an output screen that is displayed to a customer after an incorrect data entry is set forth in FIG. 9. FIG. 10 depicts a screen shot after a sample deposit has been totaled by the on-line calculator. When the user has completed the creation of the deposit, he activates the "Finished" function. If the customer confirms the transaction, as shown in FIG. 11, a screen depicting the deposit slip is shown having summary information regarding the contents. The deposit slip may then be printed.

The electronic deposit ticket creation process provides the depositor with the ability to review and correct entries within each data entry view or to return to a previous view to change data entry. Electronic deposit ticket also provides the depositor with a final total transaction review prior to committing the transaction to the final step. Once the depositor has "committed" to the transaction, the electronic deposit system accepts the transaction based upon the pre-set user identification parameters and bank criteria. Upon acceptance of the deposit transaction by the system, confirmation of the transaction is communicated to the user. The electronic deposit system returns an electronic confirmation of transaction acceptance and provides to the customer a unique transaction number.

After the deposit tracking system transaction confirmation is generated, and the user has "committed" to the transaction, the electronic deposit ticket system returns a two dimensional ("2D") barcode containing all of the detailed deposit information the depositor has entered, the unique deposit bag number, plus any depositor profile information (account number, location number, etc.) and any bank profile information (vault deposit location, etc.), including the unique transaction number. Other printed information (bank logo, depositor name, location number, bank name; vault location, carrier information, etc.) may also be generated for inclusion in the deposit document printed.

Once the transaction confirmation and electronic deposit ticket 2D barcode is received by the depositor, printing is enabled through the standard MS Windows print parameters engaged at the depositors location. In a preferred embodiment of the invention, the standard electronic deposit slip ticket or deposit document created by the program is an 8"×11.5" standard printer/copier white paper. No special paper, inks, print cartridges, printer type or others hardware is required to print the electronic deposit ticket deposit document. The standard electronic deposit ticket deposit document does not necessarily require MICR printing or functionality.

In an alternative preferred embodiment of the invention, a custom electronic deposit ticket or deposit document can include a blank deposit ticket pre-printed with a MICR line on an 8"×11.5" standard deposit ticket type paper stock. The top (or bottom) of the 8"×11.5" document includes a tear-off (perforated) deposit ticket. Other pre-printed fields can include account name, address, account number, etc. A custom electronic deposit ticket deposit document can include blank deposit ticket pre-printed with a MICR line only on an 8"×11.5" standard deposit ticket type paper stock. A second and third tear deposit document, such as a check only batch header or a high-speed cash transport barcode header document can be pre-printed or printed by the electronic deposit ticket system based upon depositor input. The electronic deposit ticket system also has the ability to print MICR lines on to plain 8.5×11 paper. Other pre-printed fields can include account information such as name, address, etc.

The electronic deposit ticket bar-coded document is folded as instructed and placed in bank-approved deposit bag (barcode face up readable through clear plastic) for delivery to the designated processing location. In an alternative embodiment, the bar code is printed onto a pressure sensitive adhesive that can be attached to the deposit container.

As illustrated in FIG. 5, the deposit-tracking feature of the invention maintains a current, real-time deposit status for each deposit transaction. The deposit status can be viewed as well as the entire detail of each deposit transaction that has been created. The standard deposit tracking status types are as follows:

1. Prepared Status: This status indicates that a depository location user has created a deposit transaction and a transaction number and electronic deposit ticket 2D barcode as been created. This status will remain until changed by the bank or deposit-processing agent. It may also be changed by an armored carrier or third party cash processor.
2. Received Status: This status indicates that the bank's receiving location (for example, a central cash vault) or $3^{rd}$ party processor has received the deposit transaction and has scanned the electronic deposit ticket 2D barcode. If an armored carrier has access to the deposit-tracking database and is able to scan the electronic deposit ticket 2 barcode, an interim status of "carrier received" could be introduced to the status hierarchy.
3. Credited Status: This status indicates the bank has provided the depositor with ledger credit for the deposit transaction. Typically, this status is applied only if the deposit was received by the bank prior to the bank's ledger credit deadline ad only after DDA posting has occurred.

4. Verified Status: This status indicates that the bank's receiving location (for example, a central cash vault) or $3^{rd}$ party processor has counted the deposit transaction and has verified that the amount of cash reported by the depository equals to the amount received.

5. Verified with Discrepancy Status: This status indicates that the bank's receiving location (for example, a central cash vault) or $3^{rd}$ party processor has counted the deposit transaction and has verified that the depositor reported amount does not equal the amount received.

The deposit discrepancy is reported in total. If denomination amounts and other deposit details were reported, the bank or $3^{rd}$ party processor can report discrepancies by denomination or other deposit media type (check, coupon, coin, etc.). If the bank's vault operating system maintains other sub-categories for discrepancy reporting, such as suspect counterfeit items or mutilated currency, that information may be built into the deposit tracking system database and if provided by the bank or $3^{rd}$ party vault processing system, would be provided to the depositor through the deposit tracking system status and detailed reporting capability.

Prepared, Armored Carrier Received, Branch Received, Received, Credited, Verified and Verified with Discrepancy deposit status views are formatted to be used as an electronic deposit receipt. Bank specific nomenclature can be included in the electronic deposit receipt to accommodate legal and regulatory requirements eliminating the need for mailing paper deposit receipts. Further, since multiple approved users can access the system, the need for the depositing location and/or bank to mail copies of deposit tickets to multiple locations is eliminated.

Sample transaction search capabilities are illustrated in FIG. 12, a screen shot of the DTS or deposit tracking system element of the invention. The standard deposit tracking and research capabilities include searching for a deposit within the following categories: (1) Date/Range of Dates, (2) Date/Range of Dates and Deposit Status (as listed above), (3) Deposit Bag Number, (4) Deposit Total, (5) Transaction Number.

FIGS. 13-15 depict sample input screens for the administration of the system including entering new banking customers, locations, and users.

Figure 16:
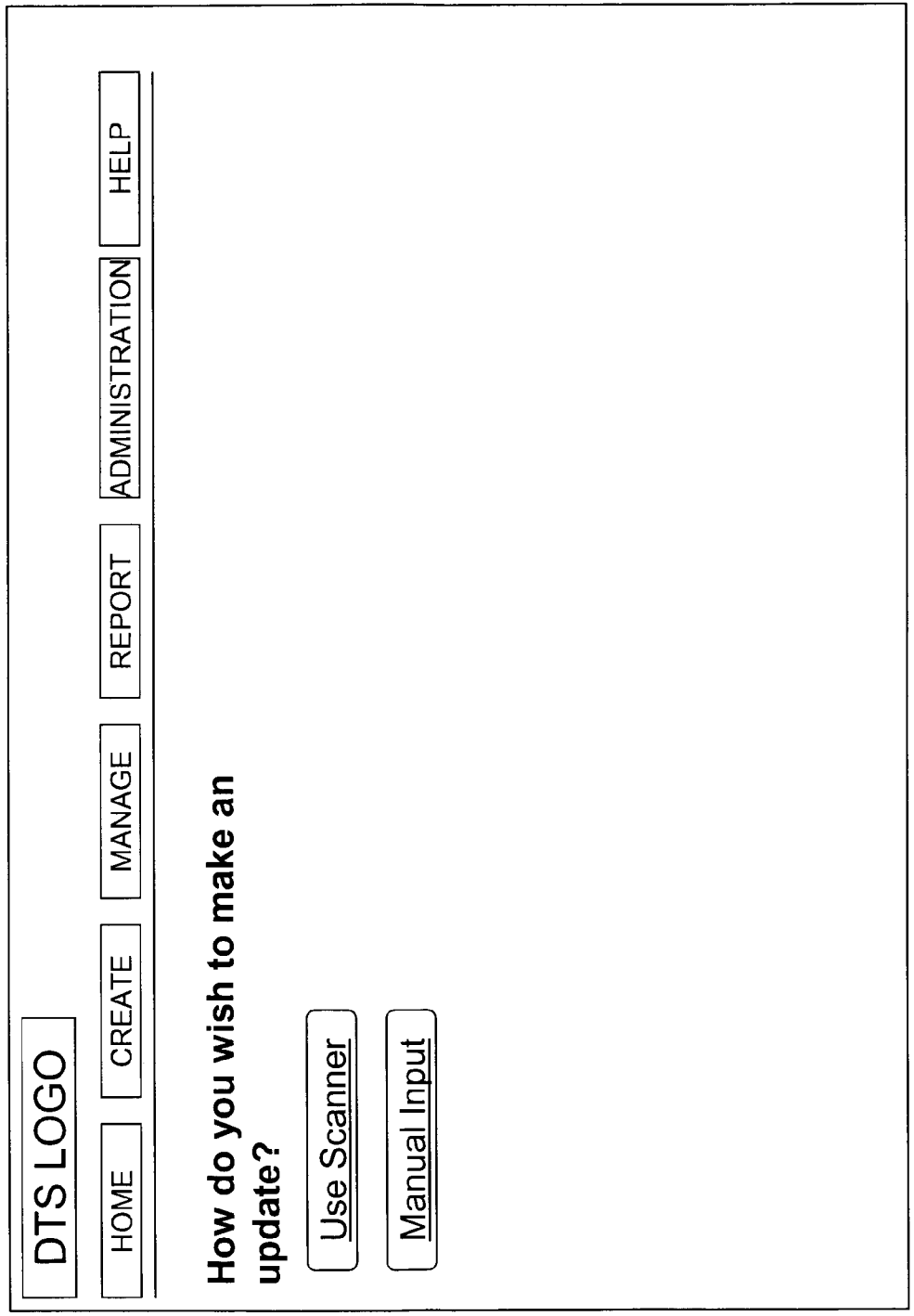
FIG. 16 depicts a bank customer screen display depicting one of the features of the invention wherein a records update may be made either manually or by a machine readable input.
Figure 17:
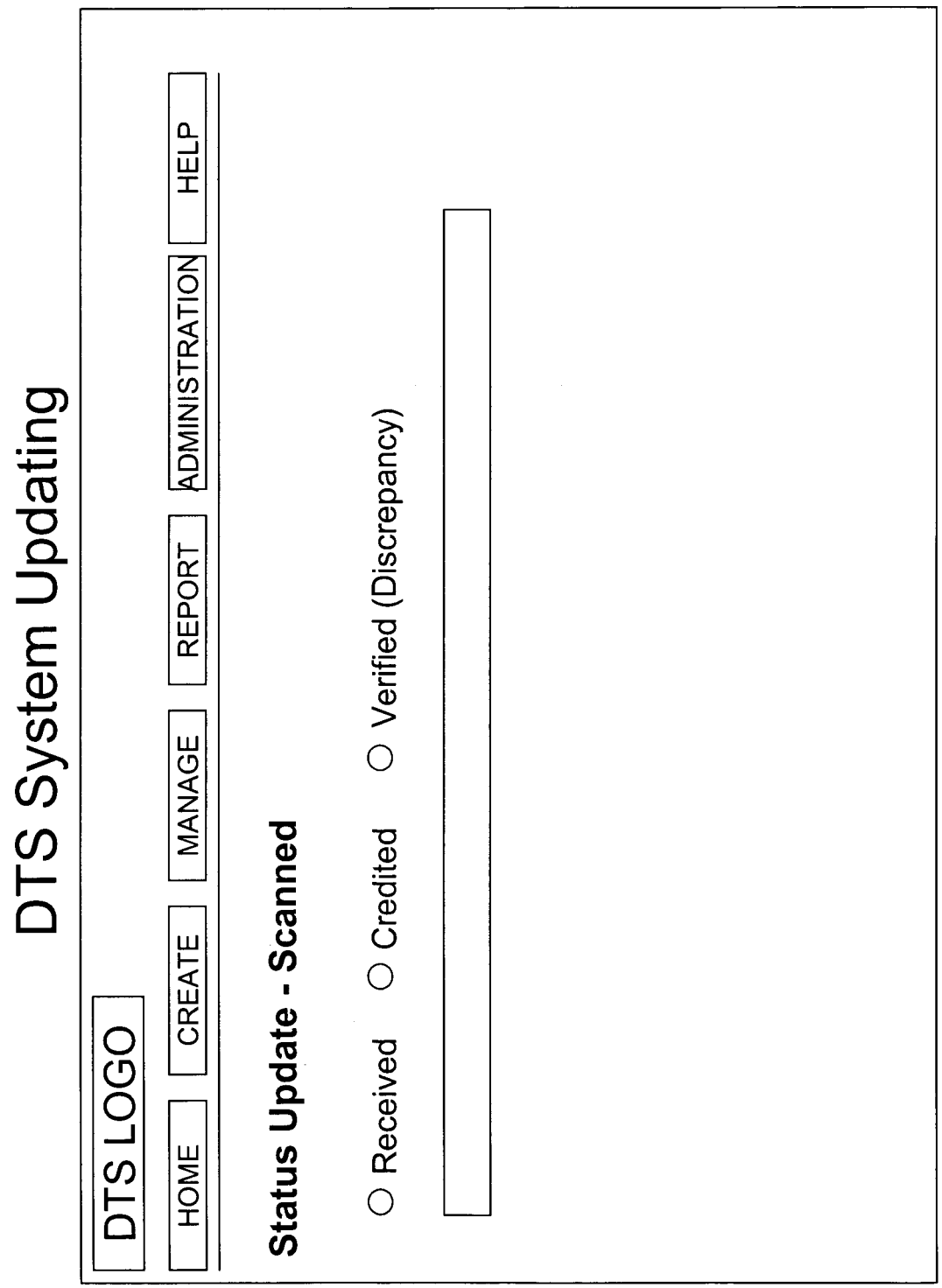
FIG. 17 depicts a bank customer screen display depicting one of the features of the invention wherein the input selection is scanned and the status is received.

FIGS. 16-18 depict screens for accepting input for the update of records, such as for the entry of scanned information from the two-dimensional barcodes or from the banks vault operation.

FIG. 19 provides an example of a sample report.

Figure 23A:
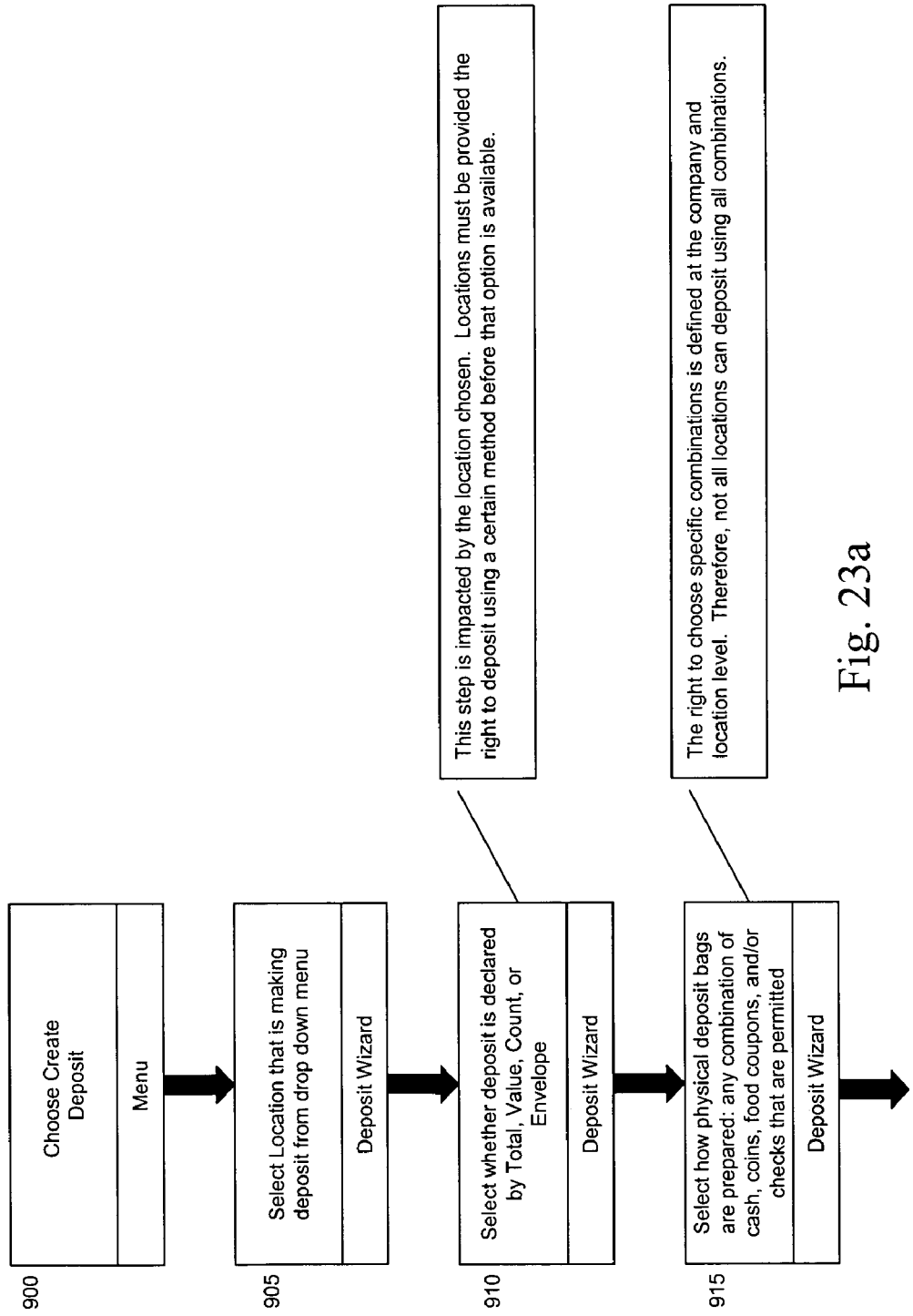
FIG. 23a-23c is schematic representation of the deposit tracking systems including a list of the features of the system.
Figure 23B:
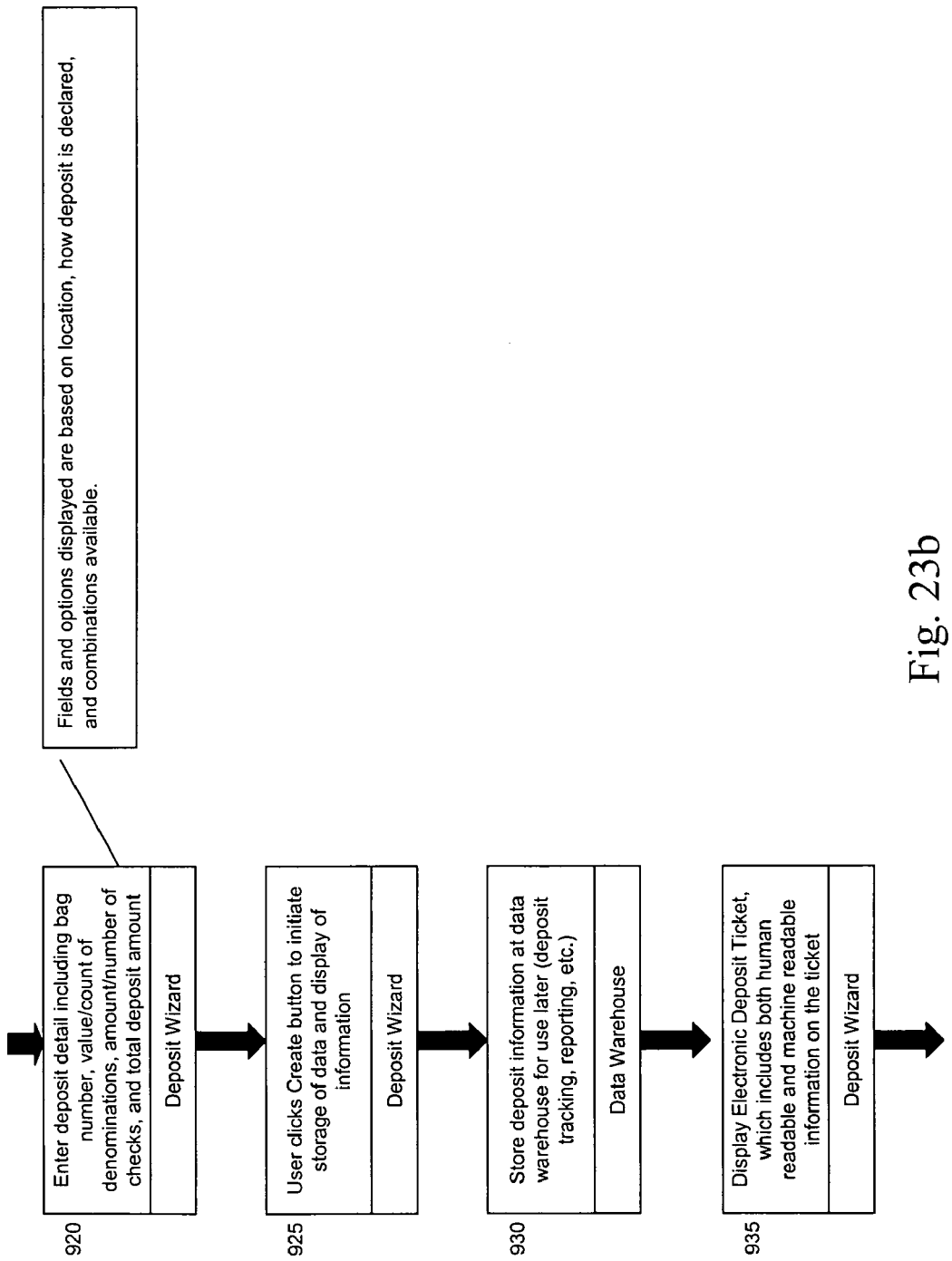
Figure 23C:
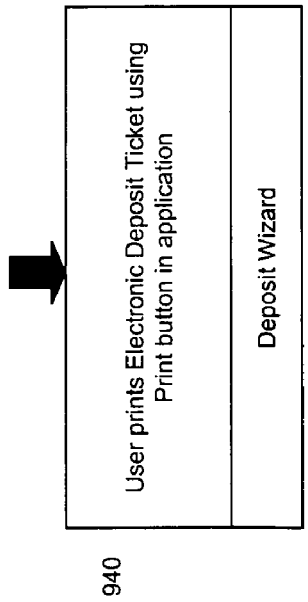
Figure 24:
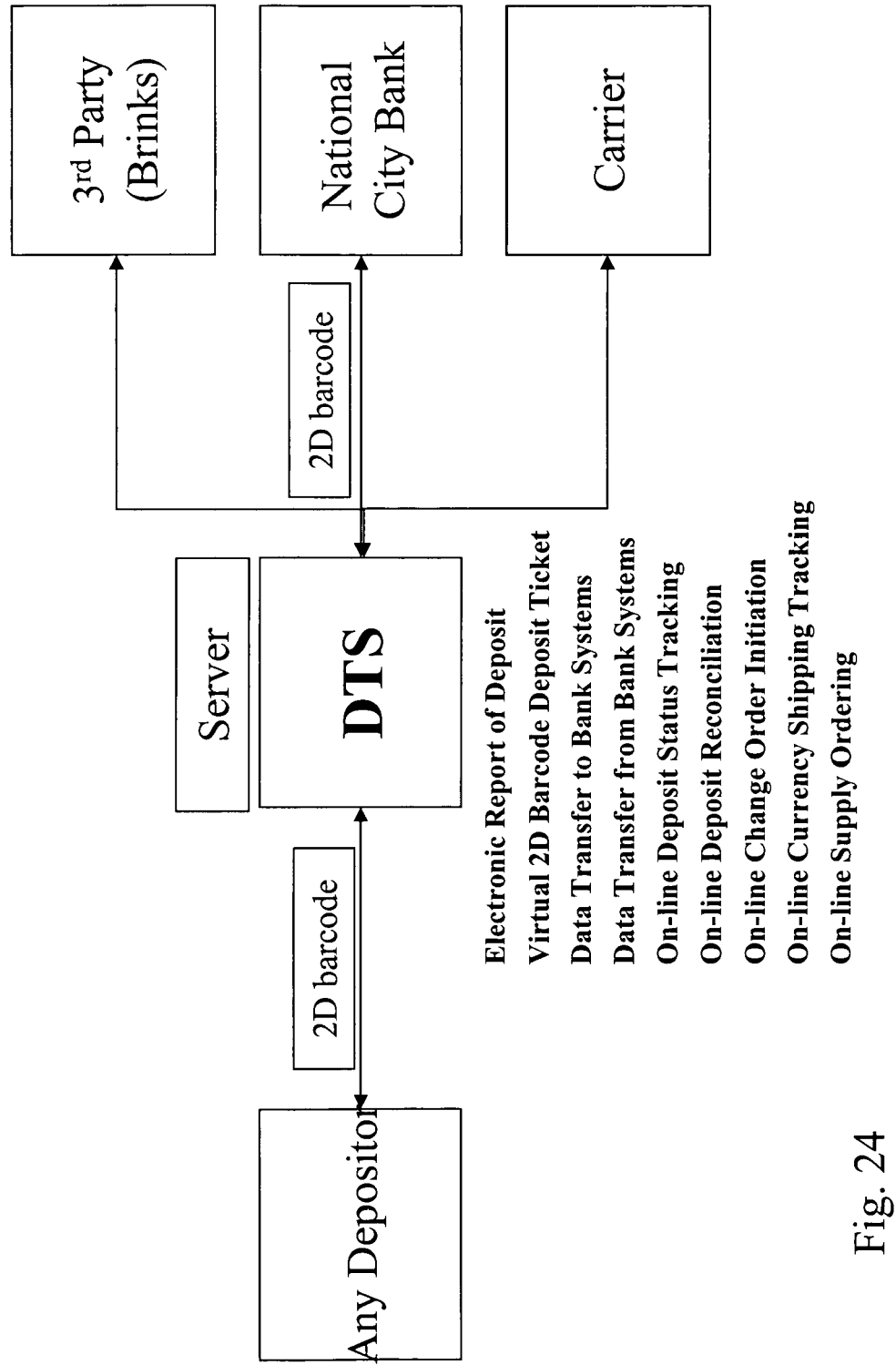
FIG. 24 is a schematic representation of the system according to the invention that reflects that the data may be processed by a bank, as well as by carriers or third party cash processors.
Figure 25:
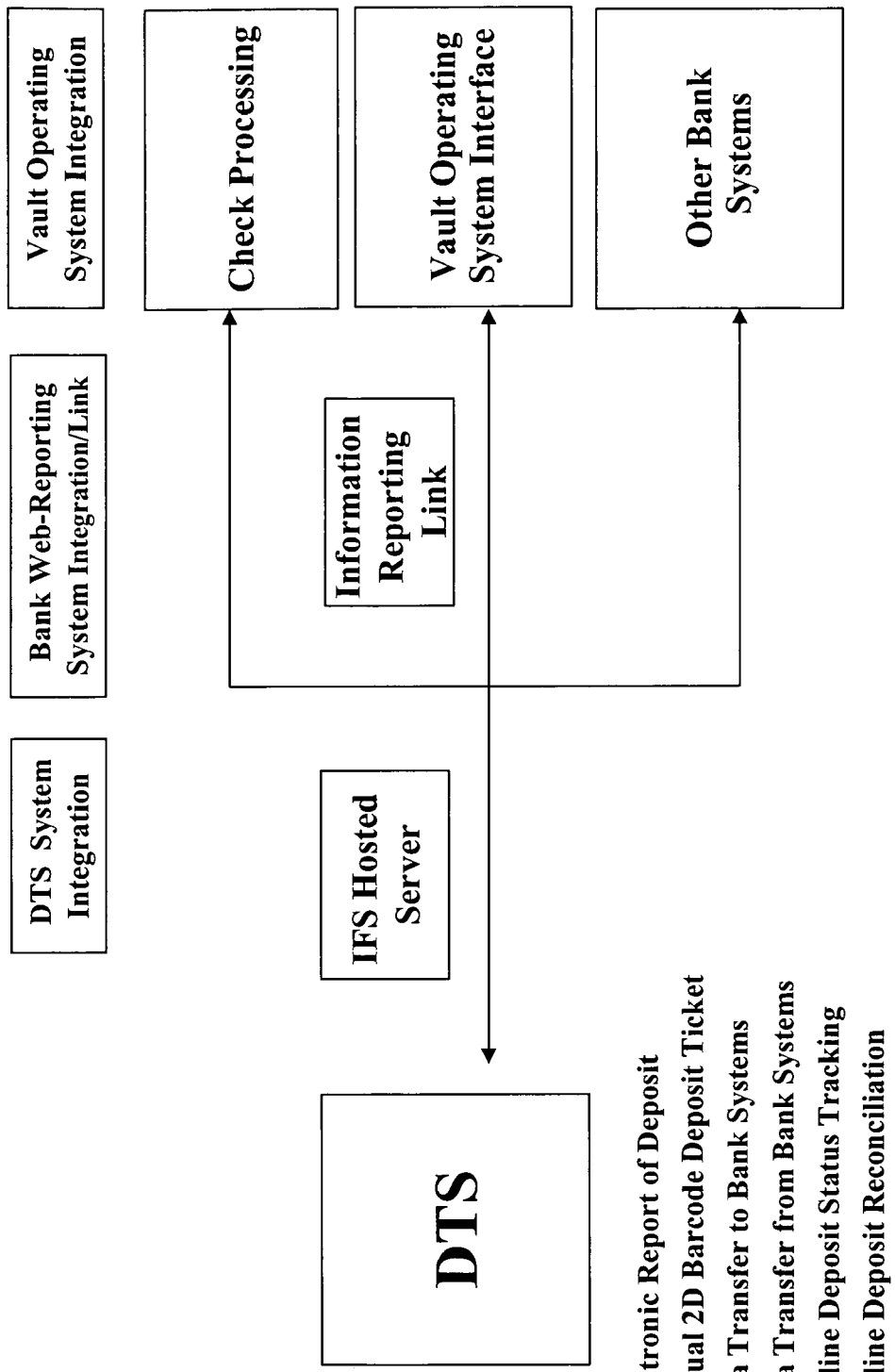
FIG. 25 is a schematic representation of the system that depicts the infrastructure that links the deposit tracking system and the vault operating system.
Figure 26:
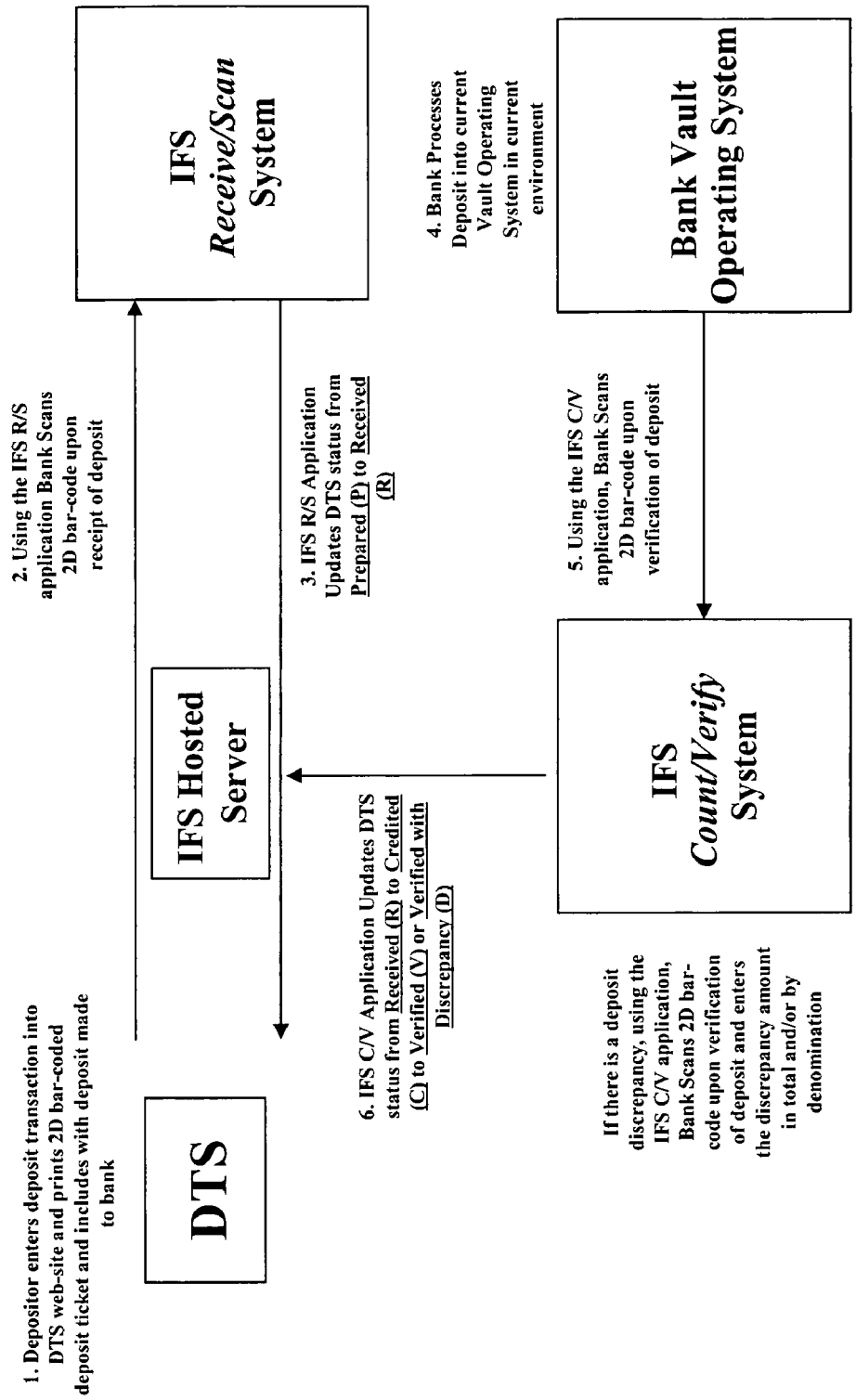
FIG. 26 is a schematic representation of the receive/scan and count/verify elements of the system.

FIG. 23a-23c depicts a flowchart of the deposit process using the deposit tracking system according to the invention. The deposit wizard comprises software for the creation of the deposit slip. The data warehouse refers to a database that contains information regarding the deposit and the account.

The depository customer can review all discrepancy only transactions for reconciliation and research through deposit tracking system database access. The timely reconciliation of accounts is regarded as an important prerequisite to an effective and efficient store deposit accounting system. The invention therefore advances these goals. All the deposit data entered and the customer profile information can be downloaded in standard formats.

Within a particular deposit only account, the deposit tracking system can provide immediate deposit reporting and daily on-line deposit reconciliation and reporting. Depositors can use the information to perform deposit reconciliation within their own accounting system. It also enables the depository customer to anticipate the funds entering their accounts for Treasury purposes.

Figure 21:
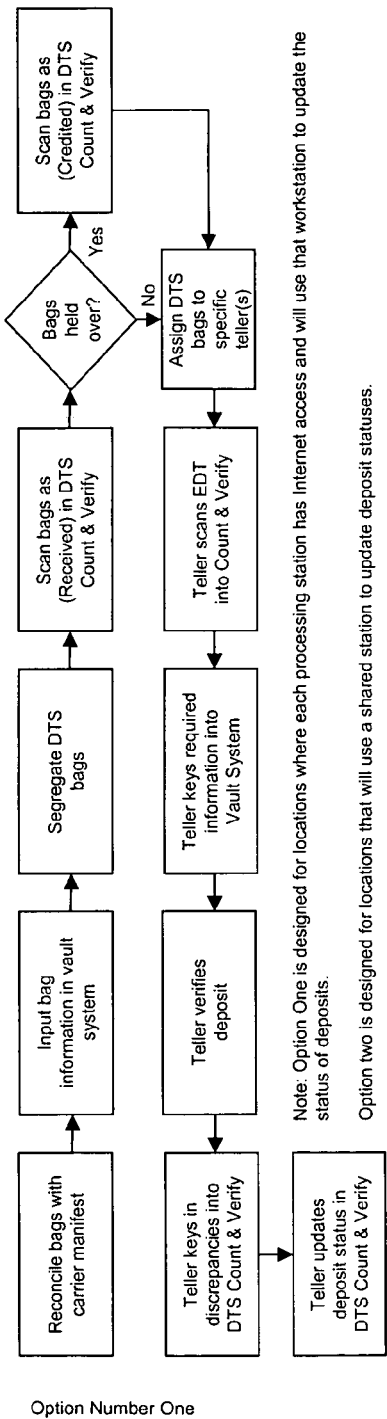
FIG. 21 is a process flow schematic depicting the of the steps in the vault process useful in locations where the processing stations have internet access and the workstations that may be used to update the status of a deposit.
Figure 22:
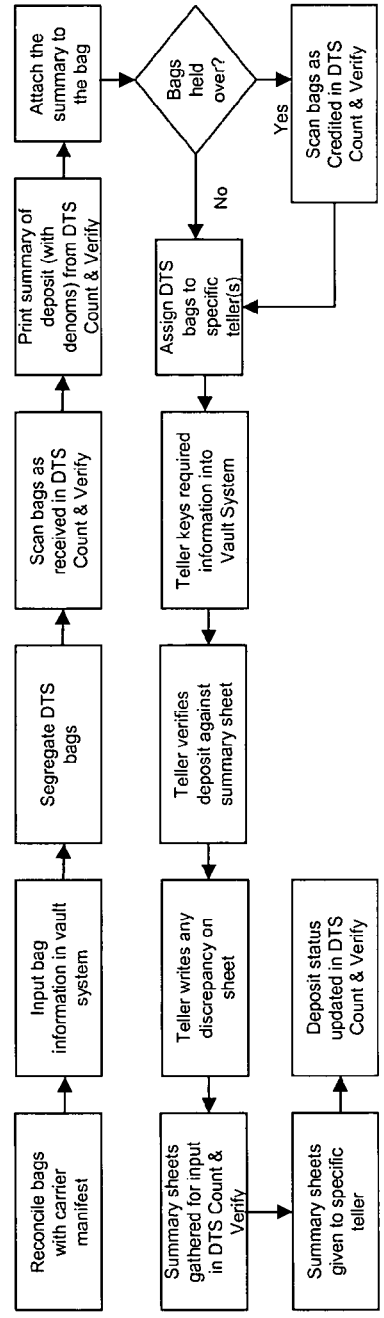
FIG. 22 is a process flow schematic of an alternative vault processing system.

Referring now to FIGS. 21 and 22, "bag held over" 1221 and 1222 refers to bags that are not processed the same day but held over to the following business day.

Figure 27:
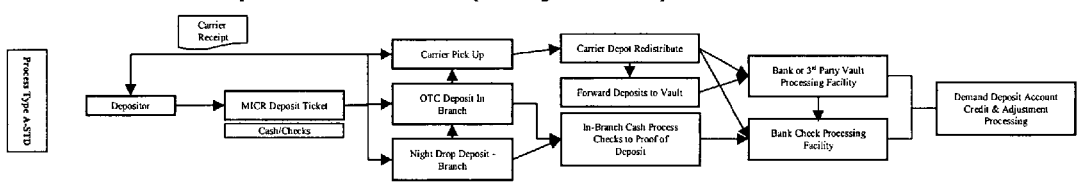
FIG. 27 is a process flow chart depicting the steps of a conventional deposit process.
Figure 28:
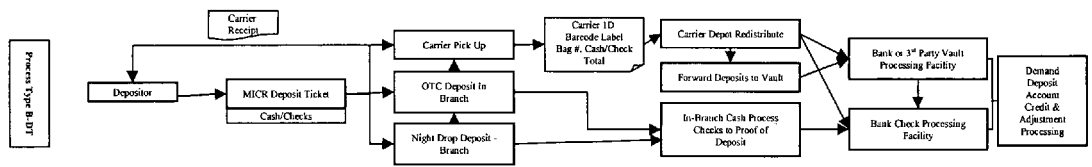
FIG. 28 depicts a representation of the steps of the deposit process using a bar code identification system that does not include detailed information regarding the deposit contents.
Figure 29:
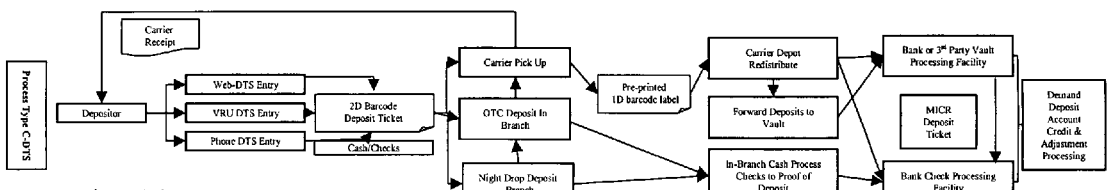
FIG. 29 depicts a representation of the steps of the deposit process in a preferred embodiment of the invention.
Figure 33:
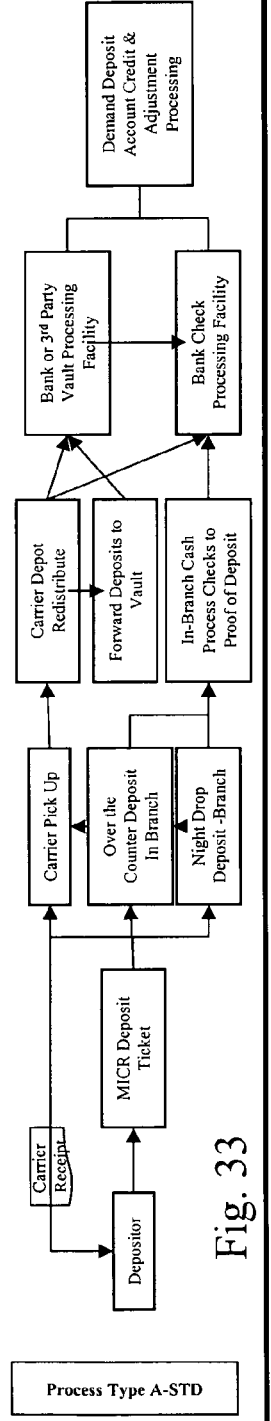
FIG. 33 is a schematic representation of data flow in a standard deposit process.
Figure 34:
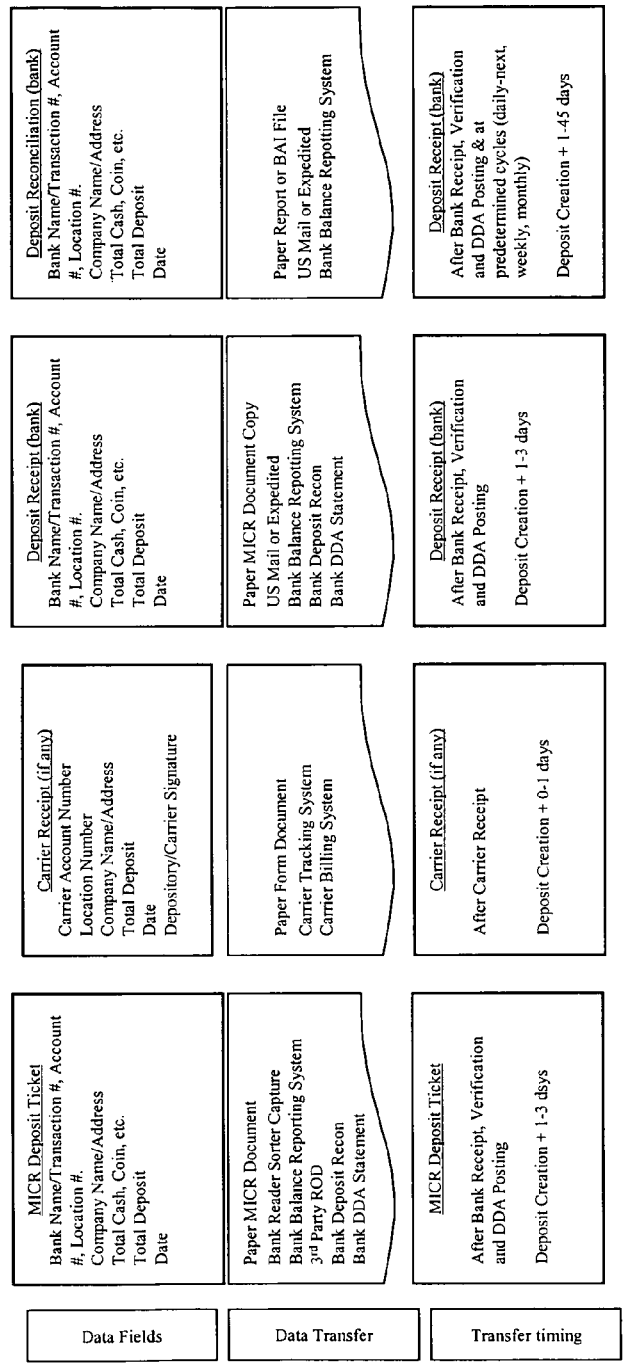
FIG. 34 provides detail of information set forth in the deposit ticket, receipts and reconciliation as illustrated in FIG. 33.
Figure 35:
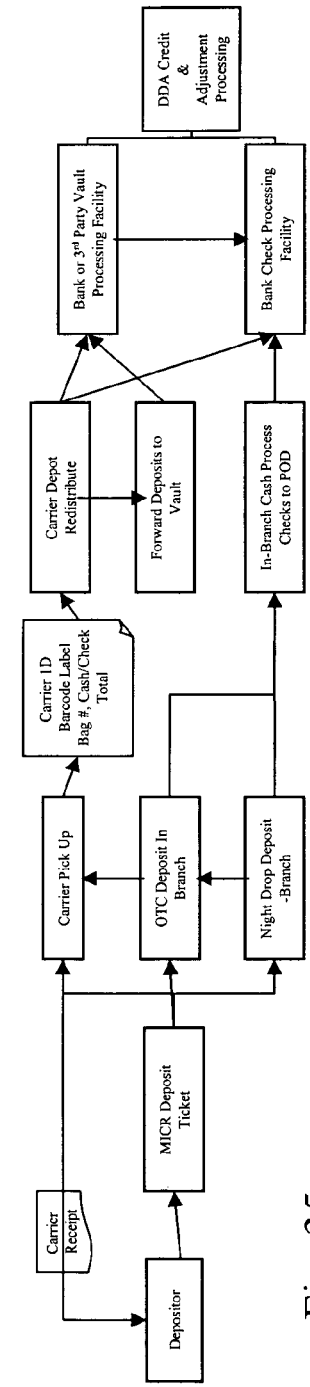
FIG. 35 is a schematic representation of data flow in an alternative deposit process wherein one dimensional data is used that is limited to a unique identification.
Figure 36:
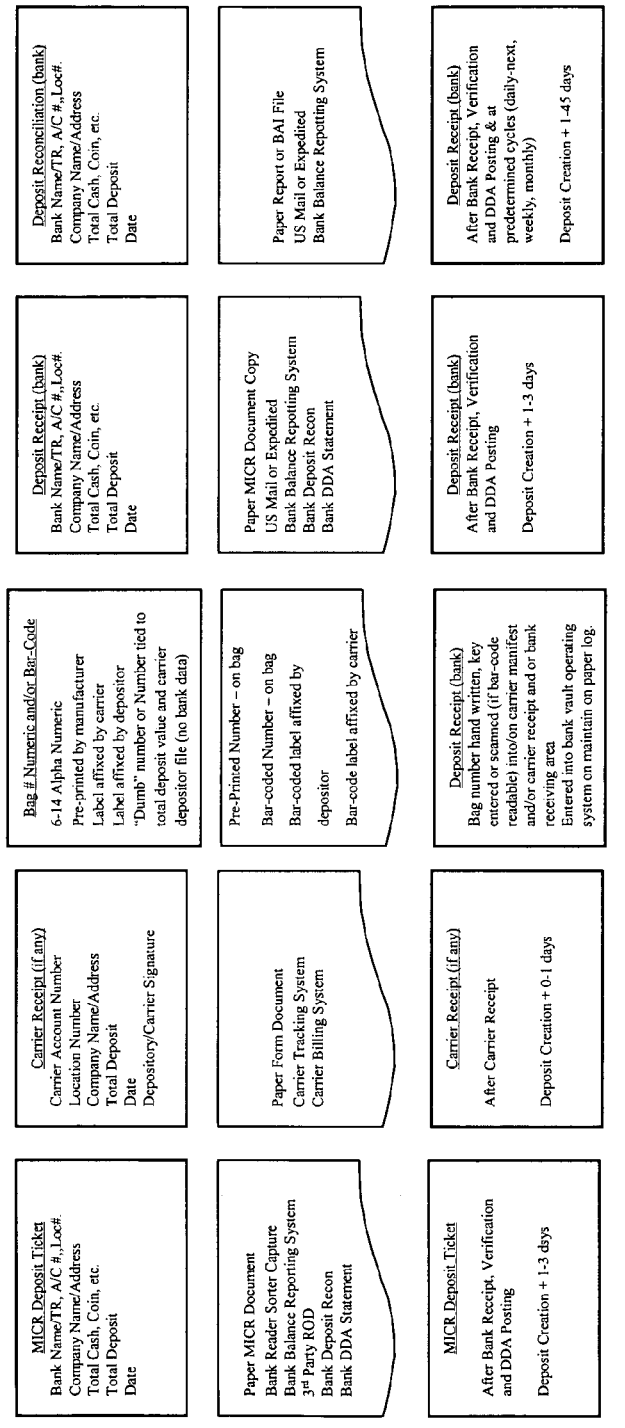
FIG. 36 provides detail of information set forth in the deposit ticket, receipts and reconciliation as illustrated in FIG. 35.
Figure 37:
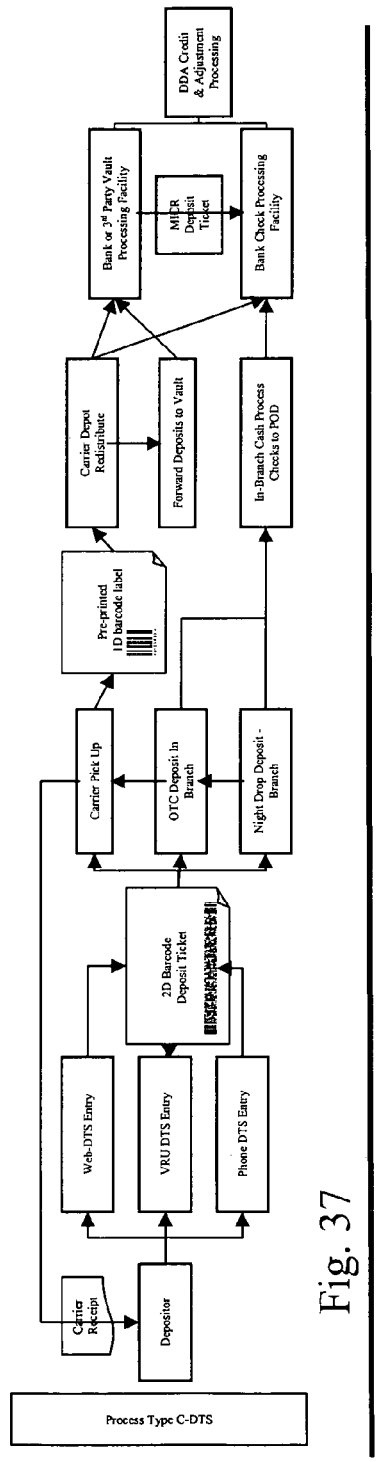
FIG. 37 is a schematic showing the deposit process in a preferred embodiment of the invention.
Figure 38:
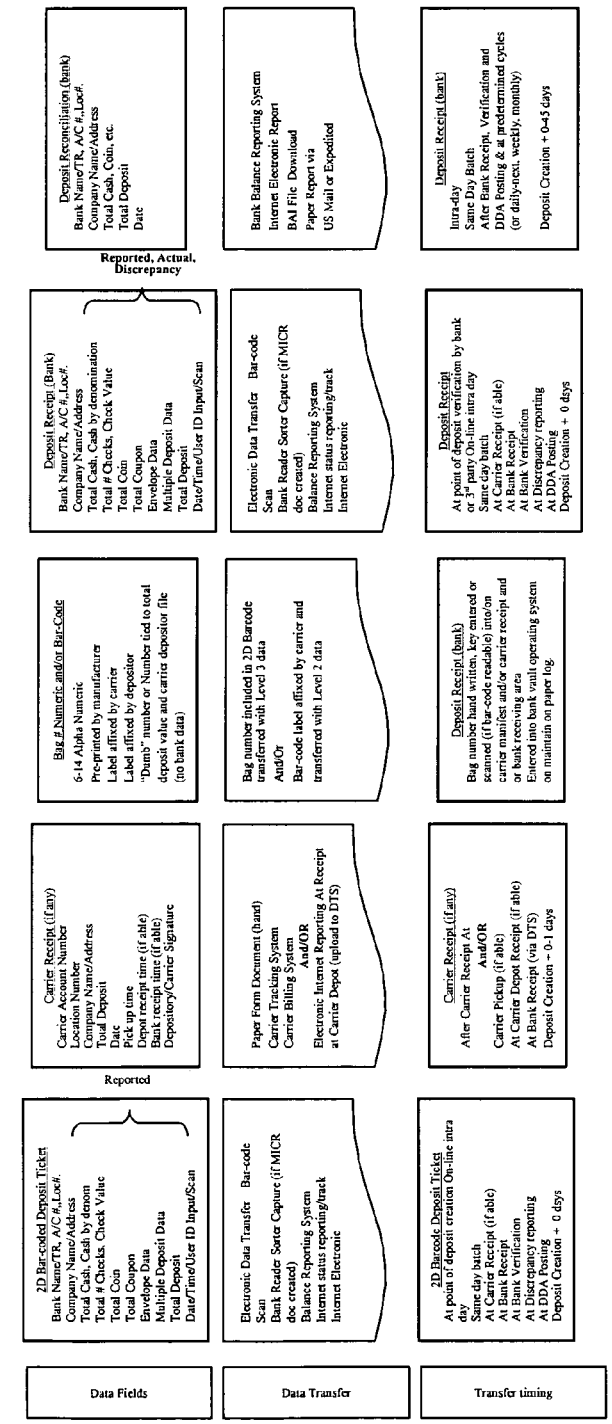
FIG. 38 provides detail of information set forth in the deposit ticket, receipts and reconciliation as illustrated in FIG. 37.
Figure 39:
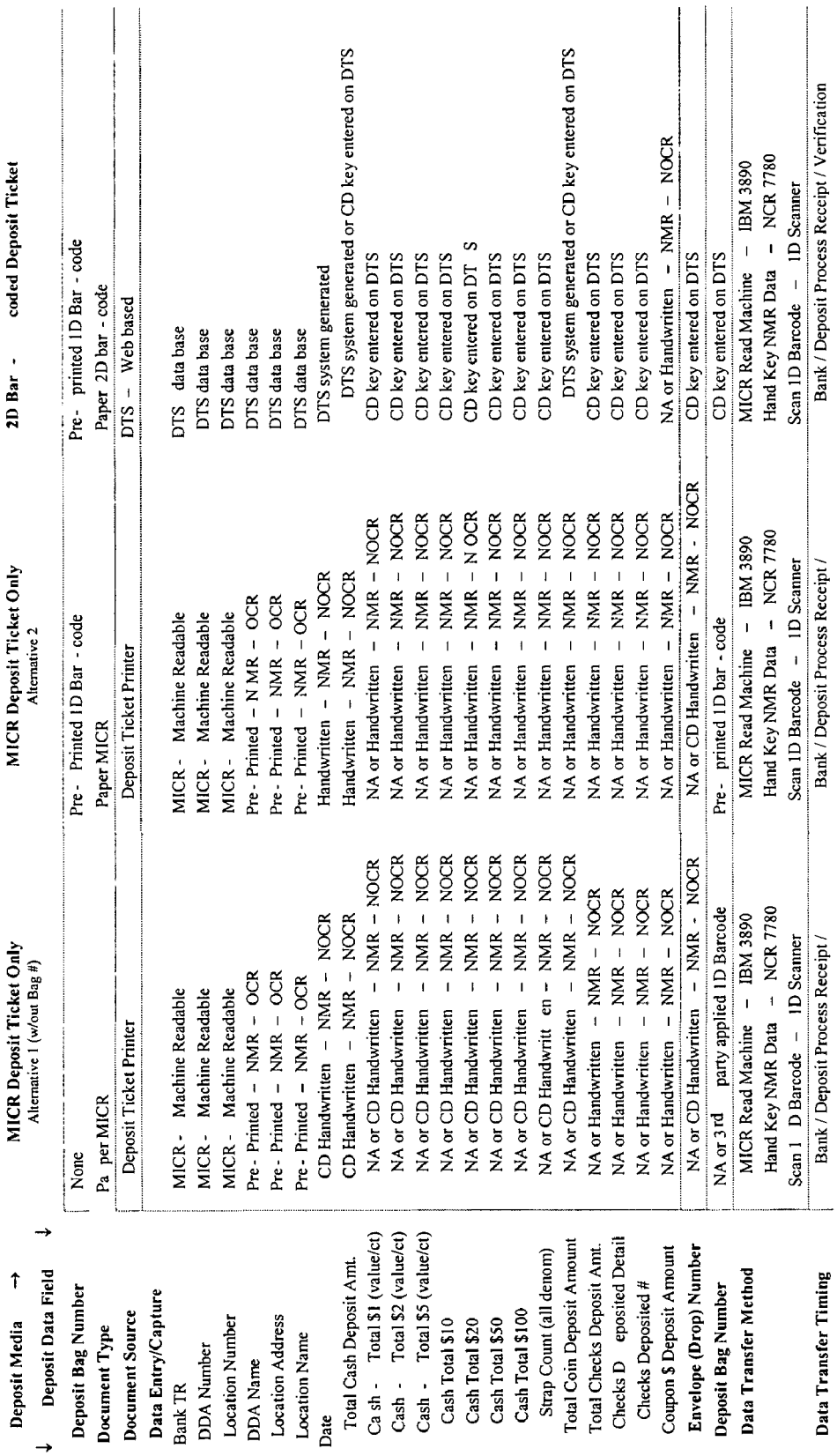
FIG. 39 depicts the data available in conventional MICR deposits and in the 2D-bar-coded deposit system of the invention.

Referring to FIGS. 27-29 alternative process flow steps are depicted. The system depicted in FIG. 28 uses a bar code label but the information coded thereon is limited to a unique identification number. It is contemplated that the unique identification number may be correlated with all of the information on the database. FIG. 29 uses the bar-code system in the preferred embodiment of the invention wherein a 2D bar-code includes information relating to the contents of the deposit.

SYSTEM INTEGRATION

A further advantage of the invention is that the system can be customized so that the features of Deposit Tracking system and electronic deposit ticket will meet the specific requirements of a bank. The tracking system and electronic deposit ticket can be integrated into the bank's existing vault operating and related bank transaction and information reporting systems through data interfaces, barcode scanning devices and web-site links. Alternatively, a bank is provided with Status Updating software applications that can be applied in parallel to a vault operating and related bank transaction and information reporting systems. The Status Updating software applications would enable a bank to scan the 2D Electronic Deposit Ticket presented with a deposit, updating the status of a deposit reported through the deposit tracking system (from "Prepared" to "Received" to "Credited" to "Verified"). In this way, the bank can quickly implement the enhanced Deposit Tracking System capability and, subsequently, engage the deposit tracking system integration process.

The system can also be used for branch currency and coin shipments: Branch shipments of excess currency and/or coin can be entered into the system and used by the central vault to track and receive incoming shipments just like customer deposits. $3^{rd}$ party coin processors can use the 2D barcode or RFID tags and database to update bank vault inventories, depositors and other participants as required in an automated, paperless environment. Branch cash shipment information can be used by the central vault to reduce ending currency inventory levels and improve federal currency order management. The system can also be used for shipments from the vault of excess cash and coin from a bank vault to the Federal Reserve Bank, 3rd party coin processor or branch/ATM locations. These transactions can be tracked and reconciled via the deposit tracking system described herein. Branch check proof work can be tracked by individual shipment enabling real time reporting and on-line missing package tracking. Late work or other delivery problems that increase bank float can be more effectively managed using the system.

The system will assist banks in meeting many shared objectives of the commercial banking industry, the retail banking and treasury services. The invention facilitates the transition of retail personnel from operational functions to sales or other income generating activities through the leveraging of centralized operations. An additional advantage of the system is that it enhances treasury management services offered to national retailers, small business and middle market customers allowing for greater market penetration resulting in increase fee income to the bank.

While a number of specific alternatives and features of the system and method have been illustrated and described herein, it will also be apparent that various modifications can be made without departing from the spirit and scope of the invention. Accordingly, it is not intended that the invention be limited, except as by the claims.

We claim:

1. A method of making, tracking and confirming the receipt of bank deposits by a user to a financial institution comprising;

accessing a user account on a database, entering deposit information on said database to create an electronic deposit record, said information comprising the amount of the intended deposit;

encoding said deposit information in a machine readable format to create a code;

associating said encoded deposit information in close proximity with a deposit creating a deposit package;

transmitting said deposit package to a financial institution;

reading said code thereby creating a signal and transmitting said signal to said database and updating information in said database from said reading thereby providing further information regarding the status of said deposit;

notifying said financial institution when an electronic deposit record has been created; and notifying said user when said code has not been read after a predetermined time has elapsed after the creation of said electronic deposit record.

2. The method recited in claim 1 wherein said database is provided on a secure internet site.

3. The method recited in claim 1 wherein said bank deposit comprises currency.

4. The method recited in claim 1 wherein said machine readable code comprises a two dimensional bar code.

5. The method system recited in claim 1 wherein said machine readable code comprises a radio frequency identification tag.

6. The method recited in claim 1 wherein said bank deposit information comprises the identity of a depositor, the account number of the depositor, and the total sum of the deposit.

7. The method recited in claim 1 wherein said notification comprises transmitting said confirmation of reception of said deposit via e-mail.

8. The method recited in claim 1 wherein said notification comprises transmitting said confirmation of reception of said deposit and confirmation of the contents of the deposit via e-mail.

9. The method recited in claim 1 wherein said notification comprises transmitting said confirmation of the deposit reception via a wireless communication transmission.

\* \* \* \* \*